(12) United States Patent
Iliuta et al.

(10) Patent No.: US 9,908,985 B2
(45) Date of Patent: Mar. 6, 2018

(54) MICROPOROUS AND HYDROPHOBIC POLYMERIC HOLLOW FIBER MEMBRANES AND METHODS FOR PREPARATION THEREOF

(71) Applicant: Université Laval, Québec (CA)

(72) Inventors: Maria Cornelia Iliuta, St-Augustin (CA); Denis Rodrigue, Québec (CA); Mosadegh Sedghi Sanaz, Québec (CA); Josée Brisson, Québec (CA)

(73) Assignee: Université Laval, Québec (CA)

( * ) Notice: Subject to any disclaimer, the term of this patent is extended or adjusted under 35 U.S.C. 154(b) by 23 days.

(21) Appl. No.: 14/426,814

(22) PCT Filed: Sep. 11, 2013

(86) PCT No.: PCT/CA2013/000774
§ 371 (c)(1),
(2) Date: Mar. 9, 2015

(87) PCT Pub. No.: WO2014/040171
PCT Pub. Date: Mar. 20, 2014

(65) Prior Publication Data
US 2015/0240045 A1 Aug. 27, 2015

Related U.S. Application Data

(60) Provisional application No. 61/699,348, filed on Sep. 11, 2012.

(51) Int. Cl.
*B01D 67/00* (2006.01)
*B01D 19/00* (2006.01)
(Continued)

(52) U.S. Cl.
CPC ............ *C08J 9/26* (2013.01); *B01D 19/0073* (2013.01); *B01D 63/021* (2013.01);
(Continued)

(58) Field of Classification Search
CPC ............ B01D 19/0073; B01D 63/021; B01D 67/002; B01D 67/003; B01D 69/02;
(Continued)

(56) References Cited

U.S. PATENT DOCUMENTS 3,214,501 A  10/1965 Strauss
3,486,968 A * 12/1969 Mater .................. B01D 67/003
                                                156/77

(Continued)

OTHER PUBLICATIONS

Dungtungee et al., "Melt rheology and extrudate swell of sodium chloride-filled low-density polyethylene: Effects of content and size of salt particles", Polymer Testing 29 (2010) 188-195.
(Continued)

*Primary Examiner* — Jason M Greene
(74) *Attorney, Agent, or Firm* — Bereskin & Parr LLP/S.E.N.C.R.L., s.r.l.

(57) ABSTRACT

There is provided a method for preparing microporous hollow fiber membranes comprising melt-extruding a polymer-salt blend followed by salt leaching. Microporous hollow fiber membranes are also disclosed.

26 Claims, 25 Drawing Sheets

(51) Int. Cl.
*B01D 69/08* (2006.01)
*B01D 63/02* (2006.01)
*B01D 71/26* (2006.01)
*C08J 9/26* (2006.01)
*C08L 23/06* (2006.01)
*B01D 69/02* (2006.01)
*B01D 61/00* (2006.01)

(52) U.S. Cl.
CPC ......... *B01D 67/002* (2013.01); *B01D 67/003* (2013.01); *B01D 69/02* (2013.01); *B01D 69/08* (2013.01); *B01D 69/087* (2013.01); *B01D 71/26* (2013.01); *C08L 23/06* (2013.01); *B01D 61/00* (2013.01); *B01D 63/02* (2013.01); *B01D 2323/04* (2013.01); *B01D 2325/38* (2013.01)

(58) Field of Classification Search
CPC ...... B01D 69/04; B01D 69/08; B01D 69/087; B01D 71/26; B01D 2325/38; C08J 9/26; C08L 23/06
See application file for complete search history.

(56) References Cited

U.S. PATENT DOCUMENTS

| | | | |
|---|---|---|---|
| 3,640,829 A | 2/1972 | Elton | |
| 3,763,055 A | 10/1973 | Le Roy et al. | |
| 4,076,656 A * | 2/1978 | White | C08J 9/26 106/122 |
| 4,100,238 A | 7/1978 | Shinomura | |
| 4,197,148 A | 4/1980 | Shinomura | |
| 4,268,279 A * | 5/1981 | Shindo | B01D 71/26 210/321.8 |
| 4,279,752 A * | 7/1981 | Sueoka | B01D 67/003 210/500.22 |
| 4,545,940 A * | 10/1985 | Mutoh | B01D 63/087 554/211 |
| 4,666,469 A * | 5/1987 | Krueger | B01D 63/04 95/54 |
| 5,022,990 A * | 6/1991 | Doi | B01D 67/003 210/500.23 |
| 5,514,378 A * | 5/1996 | Mikos | C08J 9/28 424/425 |
| 5,677,355 A | 10/1997 | Shalaby et al. | |
| 5,847,012 A | 12/1998 | Shalaby et al. | |
| 6,071,451 A * | 6/2000 | Wang | C08J 9/26 264/102 |
| 6,255,359 B1 * | 7/2001 | Agrawal | B01D 67/003 521/61 |
| 2011/0147300 A1 * | 6/2011 | Xiao | B01D 67/002 210/500.23 |
| 2011/0290716 A1 * | 12/2011 | Tada | B01D 67/002 210/500.23 |

OTHER PUBLICATIONS

Kim et al., "Absorption of carbon dioxide through hollow fiber membranes using various aqueous absorbents", Separation and Purification Technology 21 (2000) 101-109.

Lv et al., "Fabrication and characterization of superhydrophobic polypropylene hollow fiber membranes for carbon dioxide absorption", Applied Energy 90 (2012) 167-174.

Narkis et al., "Tensile Properties of Rigid Polymeric Foams Produced by Salt Extraction", Journal of Cellular Plastics, Jan./Feb., 1978, 45-49.

Sa-nguanruksa et al., "Porous polyethylene membranes by template-leaching technique: preparation and characterization", Polymer Testing 23 (2004) 91-99.

\* cited by examiner

MICROPOROUS AND HYDROPHOBIC POLYMERIC HOLLOW FIBER MEMBRANES AND METHODS FOR PREPARATION THEREOF

CROSS-REFERENCE TO RELATED APPLICATIONS

This application is a 35 USC 371 national stage entry of PCT/CA2013/000774 and which claims priority from U.S. provisional application No. 61/699,348 filed on Sep. 11, 2012. These documents are hereby incorporated by reference in their entirety.

FIELD OF THE DISCLOSURE

The present disclosure generally relates to the field of polymeric microporous hollow fiber membranes. In particular, the present disclosure relates to methods for preparing microporous hollow fiber membranes, as well as the microporous hollow fiber membranes prepared by such methods.

BACKGROUND OF THE DISCLOSURE

Wetting of porous polymeric membranes by liquid absorbents has been considered to be the major problem in membrane gas/liquid contactors (MGLC). In the non-wetted condition, the membrane pores are only filled with the gas. However, partial wetting by the liquid absorbent can result in a significant increase in membrane resistance. 1

The wetting tendency of a membrane by a specific liquid is determined by membrane chemical and morphological properties and is directly proportional to its surface energy and pore size. The reported wettability of some examples of commonly used polymeric membranes with different solutions is summarized in Table 1. It can be seen that due to its lowest surface energy, polytetrafluoroethylene (PTFE) is the most resistant polymer to wetting and therefore it has been extensively used in MGLC systems. However, several serious drawbacks including i) complicated and high cost of fabrication, ii) environmentally malignant method of fabrication (PTFE is typically fabricated via solvent-employed methods), iii) small specific interfacial area leading to a reduction in absorption efficiency, iv) unavailability of small pore sizes, due to the complexity in porosity and pore size control and v) not being recyclable (PTFE is not considered in the category of recyclable polymers), practically limit the large scale utilization of PTFE materials.

TABLE 1

| Membrane | Absorbent | Wettability | Reference |
|---|---|---|---|
| PTFE | MEA | − | Nishikawa et al.[2] |
| | Amine solution (AMP, MEA, MDEA) | − | Falk Pedersen[3] |
| | NaOH solution, MEA solution | − | Kim et al.[4] |
| | MEA, AMP | − | Matsumoto et al.[5] - deMontigny et al.[6] |
| | Water, MEA | − | Khaisri et al.[7] |
| PP | NaOH solution | + | Rangwala[8] |
| | Alkanolamine solution | + | Falk Pedersen [3] |
| | Amino acid salts (Potassium taurate) | + | Kumar et al.[9] |
| | NaOH solution, MEA solution | + | Kumar et al. [9] |

TABLE 1-continued

| Membrane | Absorbent | Wettability | Reference |
|---|---|---|---|
| | Propylene carbonate | + | Matsumoto et al.[5] |
| | Water, MEA | + | Dindore et al.[1] |
| | MEA, AMP | + | Khaisri et al.[7] - deMontigny et al.[6] |
| | Activated absorbent | + | Lu et al.[10] |
| PE | NaOH solution, MEA solution | + | Matsumoto et al.[5] |
| | MEA | + | Nishikawa et al.[2] |
| PVDF | 5% MEA + 5% TEA | − | Yeon et al.[11] |
| | Water, MEA | + | Khaisri et al.[7] |

The general characteristics of some kinds of commercial PTFE, polypropylene (PP) and polyvinylidene fluoride (PVDF) hollow fiber membranes are presented in Table 2. PP as an inexpensive and readily available alternative has been frequently considered in the literature. However, it has a large wettability and it has been reported to be wetted by alkanolamine solutions in short term operation.[1]

TABLE 2

| Description | PP | PVDF | PTFE | Reference |
|---|---|---|---|---|
| Max. available pore size (μm) | 0.25 | 0.03 | 1.0 | Lee et al.[12] |
| Max. void fraction (%) | 75.2 | 82.2 | 70.1 | Khaisri et al.[7] |
| | 82.2 | — | 59.2 | deMontigny et al.[6] |
| Max. specific area ($m^2/m^3$) | 2855 | 1488 | 1340 | Lee et al.[12] |
| | 2752 | — | 429 | deMontigny et al.[6] |
| Cost (US $/m) | 0.01 | — | 23 | deMontigny et al.[6] |
| | 0.01 | 0.36 | 11.5 | Khaisri et al.[7] |

Polyethylene (PE), having the same wetting tendency as PP, can be another alternative which has been of little consideration in the literature. However, PE can be an interesting option due to its several advantages including recyclability, flexibility of operation, simplicity of transformation to flat and hollow fiber membranes through different methods, frequent availability and inexpensive price, chemical stability higher than that of PP (due to less side groups on its molecular chains)[13] and the possibility of different hydrophobic modifications to diminish surface wettability. On the other hand, methods used for the hydrophobic treatment of polyolefins such as laser etching[14], plasma treatment[15] and solution casting[16] are mostly uneconomic and unsafe, since they use specific installations, toxic solvents and complicated procedures. In addition, most of these methods cannot be applied on non-flat surfaces and thus are of no use for hollow fiber membranes.

It has been shown that effective roughening of a specific surface can significantly increase its hydrophobicity[16,17,18,19]. For example, many natural plant leaves have super hydrophobic properties due to their rough surface structure[20]. There have also been several attempts reported in the literature to produce artificial super hydrophobic surfaces via roughening low surface energy materials[18,21]. However, despite its important role in the reduction of membrane wettability, increasing the hydrophobicity of porous polymeric membranes via creating rough structures remains untouched.

Currently, porous polymeric membranes are frequently fabricated via a conventional wet-phase inversion method through thermally induced phase separation (TIPS)[22] or non-solvent induced phase separation (NIPS)[23] processes. These processes mainly involve the dissolution of polymer in toxic organic solvents. The porous structure forms during phase separation that is induced either by thermally cooling the polymer solution or by adding a non-solvent. A serious drawback of these processes is the use of a large amount of expensive, harmful and partly flammable solvents which have to be removed after membrane formation via several intense washing procedures, making the process noneconomic and environmentally harmful. Besides the above mentioned disadvantages, these processes suffer from low production rates, due to the slow liquid-liquid phase separation phenomena[24].

Only a few solvent-free methods for fabrication of porous polymeric membranes have been reported in the literature.[25, 26,27] The most important solvent-free membrane manufacturing technique is the melt-spinning and stretching method. This technique is based on the melt extrusion of pure semi-crystalline polymers to form flat or hollow fiber precursors, followed by axial stretching of such precursors to form a porous structure. However, this technique is only applicable to semi-crystalline polymers and in addition to the mechanical stretching process, it requires several thermal post-treatments to promote the crystallinity and to avoid the membrane shrinkage[28].

There are few studies in the literature concerning the fabrication of open-cell foams containing polymer/filler composites. R. K. M. Chu et al.[29] fabricated open-cell PP foams for sound absorption applications, introducing NaCl of 106-850 µm. The foam products were then leached in water for at least 96 h to dissolve away the salts. Narkis and Joseph[30] studied the tensile properties of poly(methyl methacrylate) (PMMA), polysulfone (PSF) and polystyrene (PS) foams produced by salt extraction. Recently, Dangtungee and Supaphol[31] investigated the rheological properties of low-density polyethylene (LDPE) and sodium chloride (NaCl) mixtures of varying particle size (i.e., 45, 75, and 125 µm) in the range of 5-25 wt. %. Verdolotti et al.[32] studied the effect of the incorporation of several lithium salts (LiCl, LiClO$_4$ and LiCF$_3$SO$_3$) on the electrical and mechanical properties of polyurethane rigid (PUR) foams. However, despite the importance of porous polymeric products, there has been little concentration on the employment of open-cellular foams, prepared via leaching the salts from a polymer/salt composite matrix, for membrane applications. Moreover, the leaching process, the most important part of this technique, still remains noticeably untouched. Long leaching durations (around 90 h) and a batch wise leaching process as a post treatment make the reported processes industrially inapplicable. Further, none of the abovementioned studies concentrated on the control of salt particle size, salt content and the final product shape (only film products were prepared). In addition, inhomogeneity and the large particle size of the salts used (45-850 µm) makes the reported foams inappropriate for membrane applications.

SUMMARY OF THE DISCLOSURE

It would thus be highly desirable to exploit a hybrid process which combines melt extrusion with a continuous template-leaching technique, as a novel solvent-free method for hydrophobic hollow fiber membrane fabrication.

Accordingly, there is provided a method for preparing a microporous hollow fiber membrane, which comprises:

mixing at least one polymer suitable for melt extrusion with at least one suitable water soluble salt so as to form a mixture;

extruding the mixture under conditions suitable to form a hollow fiber membrane comprising the mixture; and leaching the hollow fiber comprising the mixture in water under conditions suitable for at least substantially removing the salt from the hollow fiber membrane.

According to another aspect, there is provided a method for preparing a microporous hollow fiber membrane, which comprises:

mixing at least one polymer suitable for melt extrusion with at least one suitable water soluble salt to form a mixture;

extruding the mixture under conditions suitable to form a hollow fiber membrane comprising the mixture; and leaching the hollow fiber membrane comprising the mixture in water under conditions suitable for the removal of salt to proceed to a sufficient extent.

According to another aspect, the present application includes a hydrophobic microporous hollow fiber membrane comprising:

a porosity of about 10 to about 80%;
a mean roughness ($R_a$) of about 100 nm to about 1000 nm;
a water contact angle of about 110 to about 140°; and
microporous pores having a diameter of about 0.1 to about 1000 µm.

According to another aspect, the present application includes a hydrophobic microporous hollow fiber membrane comprising a porosity of about 40 to about 60%;
a mean roughness ($R_a$) of about 600 to about 800 nm;
a water contact angle of about 128 to about 140°; and
microporous pores having a diameter of about 1 to about 20 µm.

According to another aspect, the present application includes a hydrophobic microporous hollow fiber membrane comprising:

a porosity of about 49 to about 51%;
a mean roughness ($R_a$) of about 650 to about 750 nm;
a water contact angle of about 128 to about 140°; and
microporous pores having a diameter of about 2 to about 5 µm.

According to another aspect, the present application includes a hydrophobic microporous hollow fiber membrane comprising:

a density of about 0.70 to about 0.72 g/cm$^3$;
a porosity of about 49 to about 51%;
a mean roughness ($R_a$) of about 650 to about 750 nm;
a water contact angle of about 128 to about 140°; and
microporous pores having a diameter of about 2 to about 5 µm.

According to a further aspect, the application includes a microporous hollow fiber membrane prepared by a method for preparing a microporous hollow fiber membrane, which comprises:

mixing at least one polymer suitable for melt extrusion with at least one suitable water soluble salt under conditions suitable to form a polymer-salt blend;

extruding the polymer-salt blend under conditions suitable to form a hollow fiber comprising the polymer-salt blend; and leaching the hollow fiber comprising the polymer-salt blend in water under conditions suitable for the removal of salt to proceed to a sufficient extent.

It was found that the methods and membranes disclosed in the present disclosure are capable to provide the effective roughness on a membrane surface which could, for example, significantly diminish the membrane wettability. For example, since no post-treatments are employed, thesemethods canbe expected to be industrially applicable for various kinds of polymers.

For example, the present disclosure describes highly hydrophobic microporous LDPE hollow fiber membranes prepared using melt extrusion of LDPE/NaCl blends followed by a salt leaching process in water. Membrane porosity can be dependent on the amount of salt removed from the hollow fiber structure and, up to a certain limit dictated by operational constraints, can be increased with an increase in initial salt content. Surface roughness of the fabricated membranes due to the existence of micropapillas, resulted in a remarkable increase in hollow fiber membrane hydrophobicity compared to a blank hollow fiber with a smooth surface.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The following drawings represent examples that are presented in a non-limitative manner.

DETAILED DESCRIPTION OF THE DISCLOSURE

Figure 1:
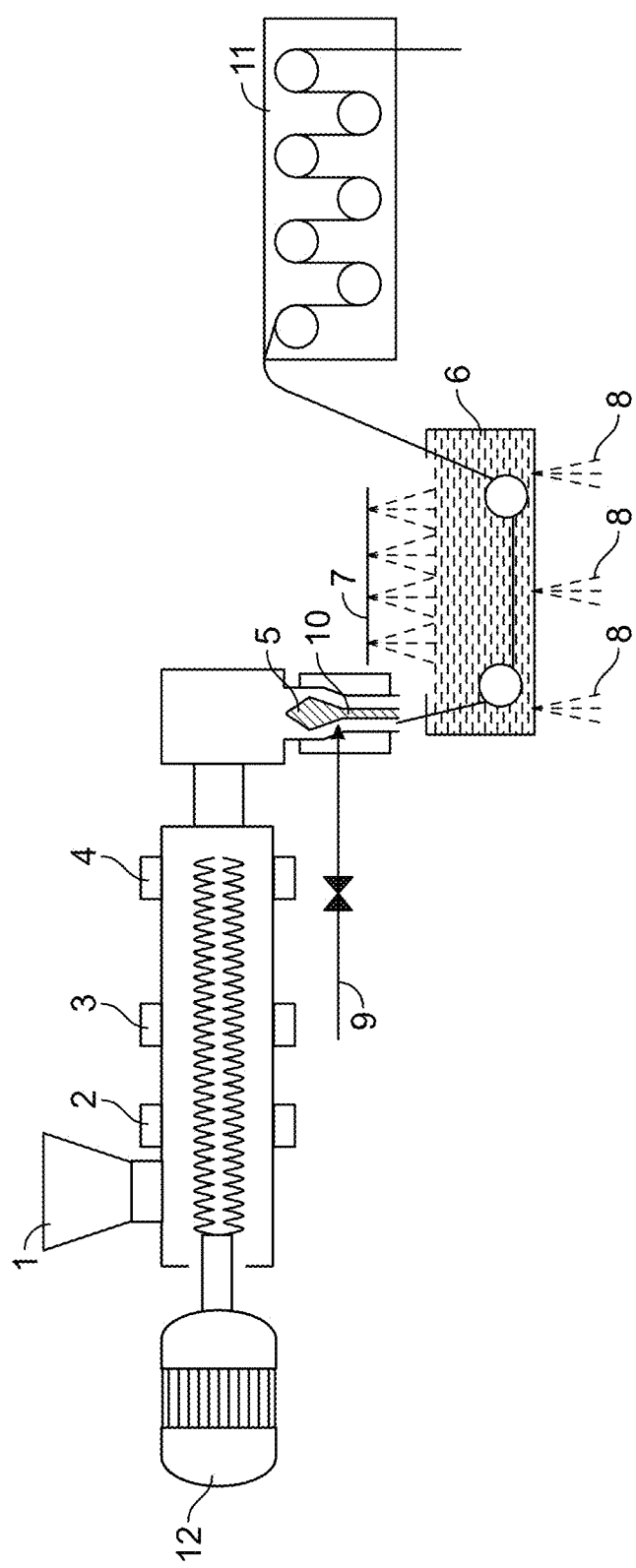
FIG. 1 is a schematic representation of a melt-extrusion, cooling and drawing system for hollow fiber precursor fabrication according to the present disclosure.

Unless otherwise indicated, the definitions and embodiments described in this and other sections are intended to be applicable to all embodiments and aspects of the application herein described for which they are suitable as would be understood by a person skilled in the art.

As used in this application, the singular forms "a", "an" and "the" include plural references unless the content clearly dictates otherwise. For example, an embodiment including "a polymer" should be understood to present certain aspects with one polymer, or two or more additional polymers.

In embodiments comprising an "additional" or "second" component, such as an additional or second polymer, the second component as used herein is chemically different from the other components or first component. A "third" component is different from the other, first, and second components, and further enumerated or "additional" components are similarly different.

The term "suitable" as used herein means that the selection of the particular compound or conditions would depend on the specific manipulation to be performed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "at least substantially removing the salt from the hollow fiber membrane" has used herein refers, for example, to removing at least 70, 75, 80, 85, 90, 95, 96, 97, 98 or 99% by weight of the salt contained in the hollow fiber membrane.

The expression "proceed to a sufficient extent" as used herein with reference to a chemical reaction or a physical reaction in a process disclosed herein means that the chemical reaction or physical reaction proceeds to an extent that conversion of the starting material or substrate to product is maximized. Conversion may be maximized when greater than about 5, 10, 15, 20, 25, 30, 35, 40, 50, 55, 60, 65, 70, 75, 80, 85, 90, 95 or 100% of the starting material or substrate is converted to product.

The term "microporous" as used herein with reference to the hollow fiber membranes disclosed herein means the membranes have a pore size of from about 1 μm to about 15 μm, or about 2 μm to about 5 μm.

MEA as used herein refers to monoethanolamine:

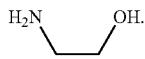

AMP as used herein refers to 2-amino-2-methyl-1-propanol:

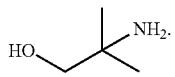

MDEA as used herein refers to methyldiethanolamine:

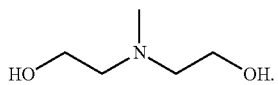

TEA as used herein refers to triethanolamine:

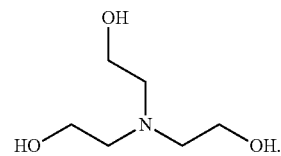

PTFE as used herein refers to polytetrafluoroethylene:

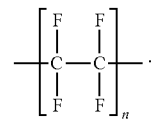

PVDF as used herein refers to polyvinylidene fluoride:

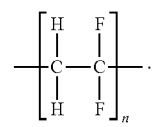

PP as used herein refers to polypropylene:

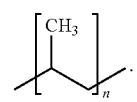

PE as used herein refers to polyethylene:

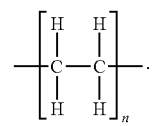

LDPE as used herein refers to low density polyethylene. PP as used herein refers to polypropylene:

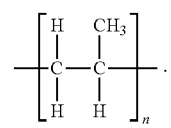

PMMA as used herein refers to poly(methyl methacrylate):

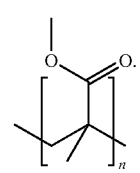

PSF as used herein refers to a series of polymers containing in their main chain mostly sulfone groups (SO₂) and ether groups, each linked to aromatic rings on both sides, with ether and solfones alternating along the chain. For example, the following commercial polymers are both called polyethersulfones:

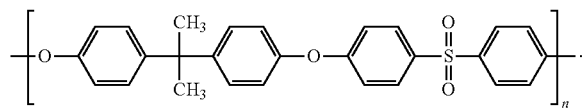

PS as used herein refers to polystyrene:

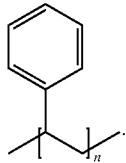

For example, the at least one suitable water soluble salt can have an average particle size of about 2 to about 15 μm, about 3 to about 12 μm or about 5 to about 10 μm.

For example, the mixture can comprise about 40 to about 60% or about 45 to about 55% by weight of the at least one suitable water soluble salt based on the total weight of the mixture.

For example, the conditions suitable to form the mixture can comprise:

mixing the at least one polymer suitable for melt extrusion with the at least one suitable water soluble salt so as to form a physical blend; and feeding the physical blend into an apparatus suitable for melt blending the at least one polymer suitable for melt extrusion with the at least one suitable water soluble salt to form the mixture.

For example, the method can further comprise feeding the mixture into an apparatus suitable for converting the mixture into pellet form.

For example, the conditions suitable to form a hollow fiber membrane can comprise feeding the mixture into an apparatus suitable for melt extruding the mixture through a hollow fiber die.

For example, the hollow fiber die can have an inside diameter of about 1 mm to about 10 mm, and an outside diameter of about 1.5 mm to about 11 mm.

For example, the inside diameter can be about 5 mm and the outside diameter can be about 7 mm.

For example, the mixture can be fed into the apparatus suitable for melt extruding the mixture through a hollow fiber die is in pellet form.

For example, the conditions suitable for at least substantially removing the salt from the hollow fiber membrane can comprise leaching the hollow fiber membrane with water in a vessel at a temperature suitable for weakening the mechanical properties of the at least one polymer suitable for melt extrusion, for a time of about 120 min to about 160 min or about 160 min. For example, the time can depend upon the initial concentration of salt.

For example, the water in the vessel can be changed every about 15 h to about 30 min or about every about 20 min.

For example, the vessel can be suitable for continuous leaching of the hollow fiber membrane with water.

For example, the polymer suitable for melt extrusion can be chosen from thermoplastic melt-processable polymers, thermoplastic melt-processable copolymers, thermoplastic melt-processable elastomers, thermoplastic melt-processable composites, heat-curable thermoset polymers, heat-curable thermoset copolymers, heat-curable thermoset elastomers and heat-curable thermoset composites.

For example, the polymer suitable for melt extrusion can be chosen from polyolefins, polyolefin composites, vinyl polymers (such as polymethacrylates, polyvinyl acetates, or polyvinyl chlorides) polyacrilonitriles, polystyrene, polyesters, polyurethanes, nylons, and polyethersulfones.

For example, the polymer suitable for melt extrusion can be low density polyethylene (LDPE).

For example, the LDPE can have a density of about 910 kg/m³ to about 925 kg/m³, about 915 kg/m³ to about 920 kg/m³ or about 919 kg/m³.

For example, the LDPE can have a melt index of about 0.8 g/10 min to about 7.5 g/10 min, about 1 g/10 min to about 5 g/10 min, about 2 g/10 min to about 4 g/10 min or about 2.3 g/10 min.

For example, the hollow fiber membrane can be leached with water at a temperature of about 10° C. to about 60° C. or about 60° C.

For example, the suitable water soluble salts can be chosen from alkali metal salts and alkaline-earth metal salts.

For example, the suitable water soluble salts can be chosen from alkali metal chlorides, alkali metal bromides, alkali metal iodides, alkali metal fluorides, alkali metal acetates, alkali metal carbonates, alkali metal phosphates, alkali metal sulfates and alkali metal nitrates.

For example, the alkali metal can be Li, Na, or K.

For example, the suitable water soluble salts can be chosen from alkali-earth metal chlorides, alkali-earth metal bromides, alkali-earth metal iodides, alkali-earth metal fluorides, alkali-earth metal acetates, alkali-earth metal carbonates, alkali-earth metal phosphates, alkali-earth metal sulfates and alkali-earth metal nitrates.

For example, the alkali-earth metal can be Mg or Ca.

For example, the suitable water soluble salt is sodium chloride.

Microporous and highly hydrophobic low density polyethylene (LDPE) hollow fiber membranes with inside and outside diameters of, respectively, 1.88-2.05 mm and 2.45-2.79 mm were successfully prepared via a solvent-free method, combining melt extrusion and salt-leaching techniques. NaCl particles with particle size of 1-10 μm were mixed with LDPE granules to produce a blend of 35, 40, 50, 60, 65 and 68 wt % of salt. The microporous structure was produced by leaching the salt particles from the hollow fiber matrix via immersion in water at 60° C. It was observed that leaching increased with time and with initial salt content, so that after 160 min immersion in water a reduction of 3, 6, 20 and 100% in salt content was obtained for hollow fiber membranes with initial salt content of 35, 40, 50 and 60-68 wt %, respectively. A remarkable increase in the water contact angles of hollow fiber membranes from 98° for LDPE hollow fibers fabricated without the addition of salt (blank sample) to 104°, 106°, 111°, 128°, 134° and 128°, respectively for hollow fibers with initial salt content of 35, 40, 50, 60, 65 and 68 wt %, is mainly attributed to the rough structure produced by removing imbedded salt crystals, which comprised a large number of micropapillas. The increase in surface roughness and porosity of hollow fiber membranes with the increase in initial salt content was confirmed by SEM and AFM analyses.

For example, the conditions suitable to form the mixture (comprising at least one polymer suitable for melt extrusion and at least one suitable water soluble salt) comprise melt blending at least one polymer suitable for melt extrusion with at least one suitable water soluble salt using, for example, the system shown in FIG. 1 under conditions suitable to melt blend at least one polymer suitable for melt extrusion and the at least one water soluble salt.

For example, at least one polymer suitable for melt extrusion is mixed with, for example, from about 30 wt % to about 70 wt %, from about 35 wt % to about 70 wt %, from about 35 wt % to about 65 wt %, or from about 55 to about 65 wt % of at least one suitable water soluble salt to form a preliminary polymer-salt blend. The preliminary polymer-salt blend is fed into the extruder using the hopper (1). A person skilled in the art would readily understand how to choose a suitable temperature profile (for example from about 115° C. to about 165° C., about 120° C. to about 150° C., or from about 125° C. to about 145° C.) for the extruder zones, a suitable mass flow rate (for example from about 0.2 kg/h to about 0.8 kg/h, about 0.2 kg/h to about 0.6 kg/h or from about 0.3 to about 0.5 kg/h) and a suitable screw speed (for example from about 15 rpm to about 120 rpm, about 20 rpm to about 100 rpm or from about 40 rpm to about 65 rpm). For example, when the polymer suitable for melt extrusion is LDPE with a density of about 919 kg/m$^3$ (ASTM D792) and a melt index of about 2.3 g/10 min (ASTM D1238) and the suitable water soluble salt is NaCl with particle size of about 5-10 μm, the temperature is controlled at about 115° C. for zone 1 (2), at about 135° C. for zone 2 (3) and at about 140° C. for zone 3 (4) and the die zone (5). After cooling in a water bath (6) fed by a fresh water spray (7) and emptied by salt-rich water drains (8) at a temperature from about 10° C. to about 60° C. or about room temperature, the extrudate is pelletized using a suitable method, for example using a PELL 2 pelletizer supplied by Berlyn Company to form pellets comprising the polymer-salt blend.

For example, the conditions suitable to form a hollow fiber comprising the polymer-salt blend comprise extruding the polymer-salt blend using, for example, the system shown in FIG. 1. For example, pellets comprising the polymer-salt blend can be fed into the extruder using the hopper (1). A person skilled in the art would readily understand how to choose a suitable temperature profile for the extruder zones, a suitable mass flow rate and a suitable screw speed. For example, where the polymer suitable for melt extrusion is LDPE with a density of about 919 kg/m$^3$ (ASTM D792) and a melt index of about 2.3 g/10 min (ASTM D1238) and the suitable water soluble salt is NaCl with particle size of about 5-10 the temperature is controlled at about 125° C. for zone 1 (2), and a temperature of about 145° C. to zone (2), zone 3 (4) and zone 4 (5); the extruder can be operated at a constant mass flow rate of about 0.2 kg/h to about 0.8 kg/h or about 0.4 kg/h; and the screw rate can be from about 15 rpm to about 120 rpm or about 60 rpm. The extrudate can be taken out of a hollow fiber die (10) with an inside diameter of from about 1 mm to about 10 mm or about 5 mm, and an outside diameter of about 1.5 mm to about 11 mm or about 7 mm, and cooled in a water bath (6) fed by a fresh water spray (7) and emptied by salt-rich water drains (8) at a temperature of about 10° C. to about 60° C. or about room temperature. A take-up unit (11) can be used to control drawing speed at from about 200 cm/min to about 300 cm/minor about 250 cm/min.

For example, the conditions suitable for the removal of salt to proceed to a sufficient extent comprise placing hollow fibers comprising the polymer-salt blend into a suitable vessel, fully covering the hollow fibers comprising the polymer-salt blend with water, thoroughly sealing the vessel containing the water-hollow fiber mixture, and maintaining the vessel containing the water-hollow fiber mixture at a temperature of from about 10° C. to about 60° C. or about 60° C. for a time of about 120 min to about 160 min, wherein the water in the vessel is changed every about 15 min to about 30 min or about 20 min.

For example, the polymer suitable for melt extrusion can be a suitable LDPE. The polymer can also be (polyolefins or polyolefin composites, vinyl polymers such as polymethacrylates, polyvinyl acetate, polyvinyl chloride, polyacrilonitrileor polystyrene, polyesters, polyurethanes, nylons, polyethersulfones, or any other thermoplastic polymer, copolymer, elastomer or composite, or any heat-curable thermoset polymer, copolymer, elastomer or composite). For example, the suitable LDPE can have a density of about 910 kg/m$^3$ to about 925 kg/m$^3$ or about 919 kg/m$^3$ (ASTM D792) and a melt index of about 0.8 g/10 min to about 7.5 g/10 min or about 2.3 g/10 min (ASTM D1238).

For example, the suitable water soluble salt can be NaCl of a suitable particle size. The salt can also be a water-soluble alkali or alkali earth salt (alkali fluoride, chloride bromide, iodide, acetate, carbonate, phosphate, sulfate or nitrate), which melts at a higher temperature than the chosen polymer. For example, the particle size of the NaCl can be from about 1 μm to about 20 μm, about 2 to about 15 μm or about 5 to about 10 μm.

For example, the inside diameters of the microporous hollow fiber membrane can be from about 1 mm to about 3 mm or about 1.5 mm to about 1.9 mm. For example, the outside diameters of the microporous hollow fiber membrane can be from about 1.5 mm to about 4 mm or about 1.8 to about 2.3 mm.

For example, where the polymer suitable for melt extrusion is LDPE with a density of about 919 kg/m$^3$ (ASTM D792) and a melt index of about 2.3 g/10 min (ASTM D1238) and the suitable water soluble salt is NaCl with particle size of about 5-10 μm, the water contact angles of the microporous hollow fiber membrane can be from about 104° to about 140° depending on the salt content or about 128° to about 140°.

According to a further aspect, the present application includes a microporous hollow fiber membrane prepared by a method for preparing a microporous hollow fiber membrane, which comprises:

mixing at least one polymer suitable for melt extrusion with at least one suitable water soluble salt under conditions suitable to form a polymer-salt blend;

extruding the polymer-salt blend under conditions suitable to form a hollow fiber comprising the polymer-salt blend; and leaching the hollow fiber comprising the polymer-salt blend in water under conditions suitable for the removal of salt to proceed to a sufficient extent.

The following non-limiting examples are illustrative of the present application:

EXAMPLES

Materials

The LDPE used in the work described herein was Novapol LA 0219-A (Nova Chemicals) with a density of 919 kg/m$^3$ (ASTM D792) and a melt index of 2.3 g/10 min (ASTM D1238). NaCl (SODA-LO 20) with particle size of 5-10 µm was supplied by Main Street Ingredients.

Example 1: Fabrication of LDPE Hollow Fibers

The melt-extrusion system for LDPE hollow fibers fabrication is shown in FIG. 1. LDPE hollow fiber membranes were produced using a HaakeRheomix TW-100 co-rotating twin-screw extruder. LDPE was mixed thoroughly with NaCl to form blends containing 35, 40, 50, 60, 65 and 68 wt % salt. The mixture was then fed into the extruder using the hopper (1) in two steps. In the first step, the mixture was melt blended above the melting point of LDPE to obtain a uniform polymer/salt blend. The temperature profile was controlled at 115° C. for zone 1 (2) 135° C. for zone 2 (3) and 140° C. for zone 3 (4) and the die zone, i.e. zone 4 (5). After cooling down through a water bath (6) fed by a fresh water spray (7) and emptied by salt-rich water drains (8) at room temperature, the extrudate was pelletized using a PELL 2 pelletizer supplied by Berlyn Company (not shown). In the second step, the prepared pellets were fed into the extruder using the hopper (1) at a temperature of 115° C. for zone 1 (2), 135° C. for zone 2 (3) and 140° C. for zone 3 (4) and zone 4 (5). The extruder was operated at a constant mass flow rate of 0.4 kg/h and a screw speed of 60 rpm. To produce a stable hollow fiber structure, the inside air pressure was controlled (9) to prevent collapse. The extrudate was taken out of the hollow fiber die (10) with an inside and outside diameter of 5 and 7 mm, respectively and cooled down through a water bath (6) fed by a fresh water spray (7) and emptied by salt-rich water drains (8) at 60° C. Finally, a take-up unit (11) was used to control drawing speed at 250 cm/min. A motor drive (12) is also shown in FIG. 1.

The detailed specifications of microporous LDPE hollow fiber membranes fabricated by this method are given in Table 3.

min leaching with water (after leaching), using a TA Instruments TGA model Q5000 IR from ambient temperature to 950° C. at a heating rate of 10° C./min under air.

The porosity of the hollow fiber membranes (P) was determined via density method using the relation (1):

$$P(\%) = 1 - \left(\frac{\rho_1}{\rho_0}\right) \times 100 \quad (1)$$

where $\rho_0$ is the density of nonporous LDPE hollow fiber (blank) and $\rho_1$ indicates the density of porous LDPE hollow fiber membranes with different initial salt contents. $\rho_0$ and $\rho_1$ were calculated by measuring the volume and the weight of hollow fiber samples using the relation (2):

$$\rho = \frac{W}{\pi L (R^2 - r^2)} \quad (2)$$

where W is the weight of the hollow fiber, R and r are the outer and inner diameters, respectively, and L is the length of the hollow fiber. The porous structure of hollow fiber membranes was visually investigated using a scanning electron microscope (SEM) (JEOL Ltd., JSM-840a).

Pore diameter distribution of fabricated LDPE hollow fiber membranes were calculated via digitizing and analyzing the SEM images using Image-Pro-Plus Version 5.0 software (Media Cybernetics Inc.).

Results and Discussion

Generally, leaching is a slow process. In order to accelerate this process, salt leaching was done at temperatures higher that room temperature (around 60° C.). At such temperatures, solubility and diffusion are higher, and salt particles can more easily be removed from the fiber to

TABLE 3

| Characteristics | Blank LDPE | LDPE/35 wt % NaCl | LDPE/40 wt % NaCl | LDPE/50 wt % NaCl | LDPE/60 wt % NaCl | LDPE/65 wt % NaCl | LDPE/68 wt % NaCl |
|---|---|---|---|---|---|---|---|
| Fiber outer diameter (mm) | 2.66 | 2.75 | 2.79 | 2.62 | 2.45 | 2.62 | 2.60 |
| Fiber inner diameter (mm) | 1.90 | 2.05 | 2.05 | 2.11 | 1.88 | 2.01 | 1.99 |
| Fiber thickness (mm) | 0.38 | 0.34 | 0.37 | 0.25 | 0.28 | 0.30 | 0.30 |

Example 2: Formation of Porous Structure in LDPE Hollow Fibers

Materials and Methods

The porous structure of the LDPE hollow fibers prepared by the method of Example 1 was formed by removal of salt particles using a water leaching technique. In an exemplary preparation, 30 mmof prepared hollow fiber samples were placed in small vials, fully filled with water. The vials were sealed thoroughly and kept for 160 min in an oven at 60° C. to enhance the leaching process. Water was changed every 20 min to avoid saturation.

The percentage of salt removal was determined by comparing the dry weight of each specimen before and after leaching, using a high-resolution Mettler AE 240 digital balance. In addition, the content of salt remained in/removed from LDPE hollow fiber membranes with different initial salt content was confirmed by thermo-gravimetric analysis (TGA) of fresh fibers (before leaching) and fibers after 160 diffuse into the water. The structure of PE is weakened and thus, salt particles can be easier removed from the fiber to diffuse into the water by the open cell morphology. In addition, the continuous leaching system used in this work (FIG. 1) can reduce the leaching time to a great extent.

Since the formation of a porous structure strongly depends on the amount of salt removed from the hollow fiber matrix, it is essential to determine the level of salt removed from LDPE/salt fibers. The amount of salt removed from LDPE/salt hollow fibers was obtained by comparison of the dry weight of each sample before and after leaching in water. The percentage of salt removal (% salt removal) was calculated according to the following relation.

$$\% \ Salt\ removal = \left(\frac{\%\ weightloss}{\%\ initialsaltcontent}\right) \times 100 \quad (3)$$

Figure 2:
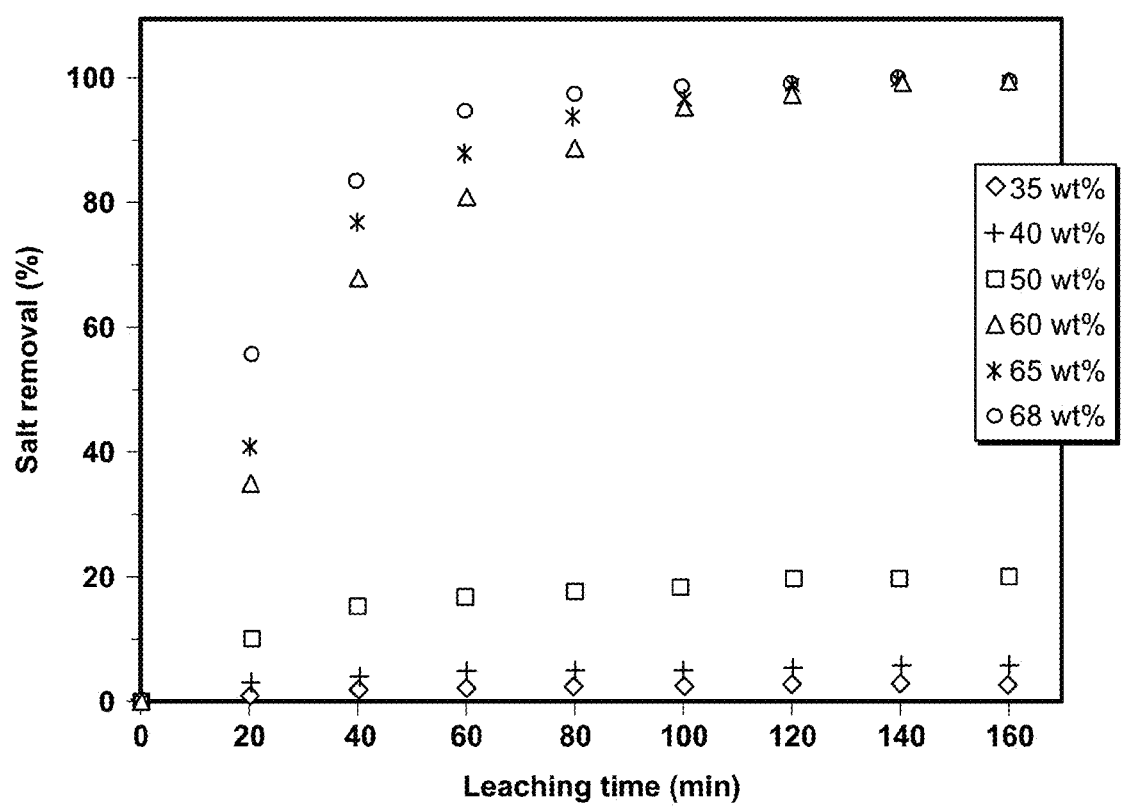
FIG. 2 shows the percentage of salt removal from hollow fiber membranes with different initial salt contents.
Figure 3:
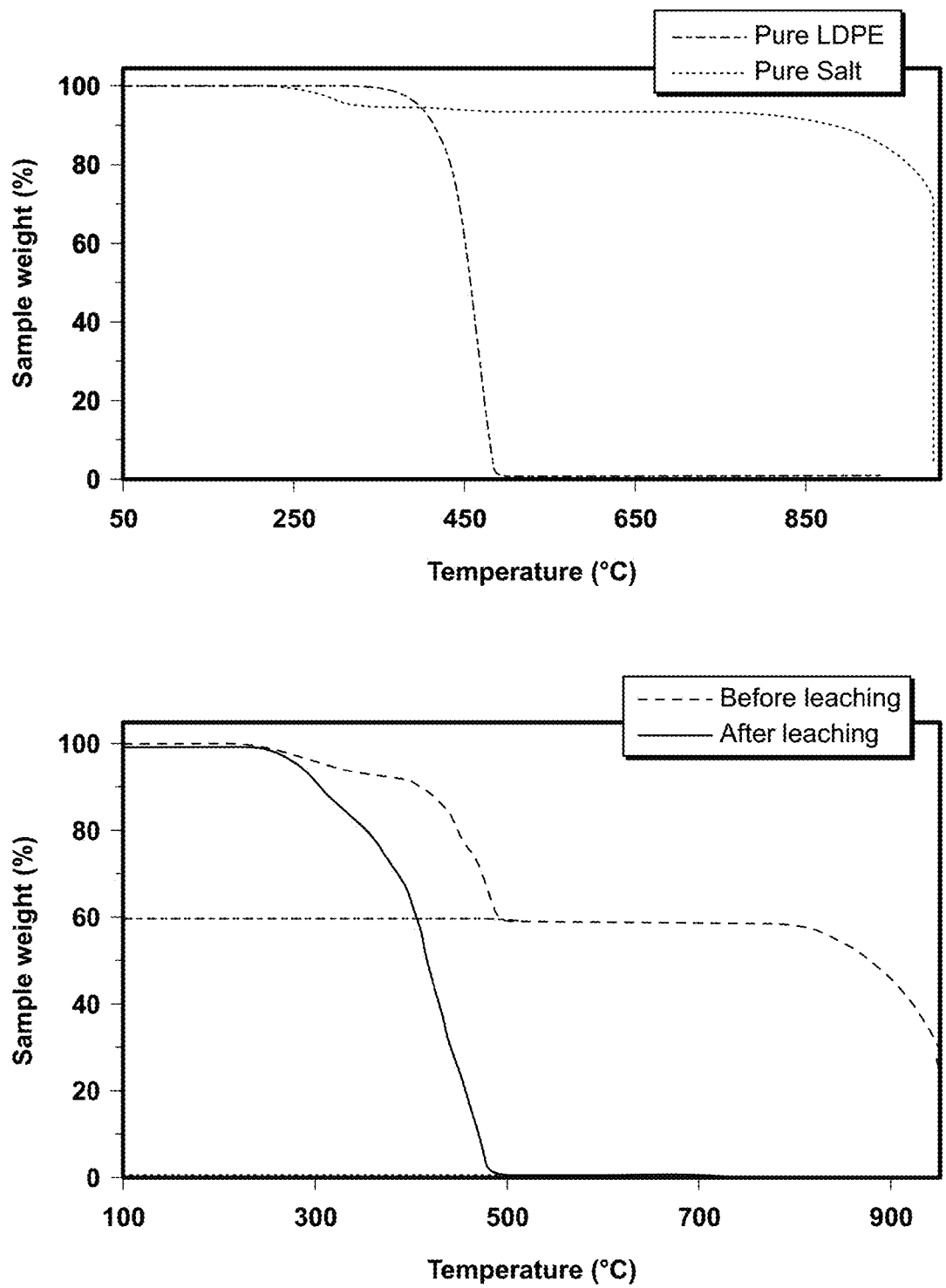
FIG. 3 shows thermogravimetric analysis (TGA) curves for LDPE hollow fiber membranes with initial salt content of 68 wt %, after leaching for 160 min.
Figure 4:
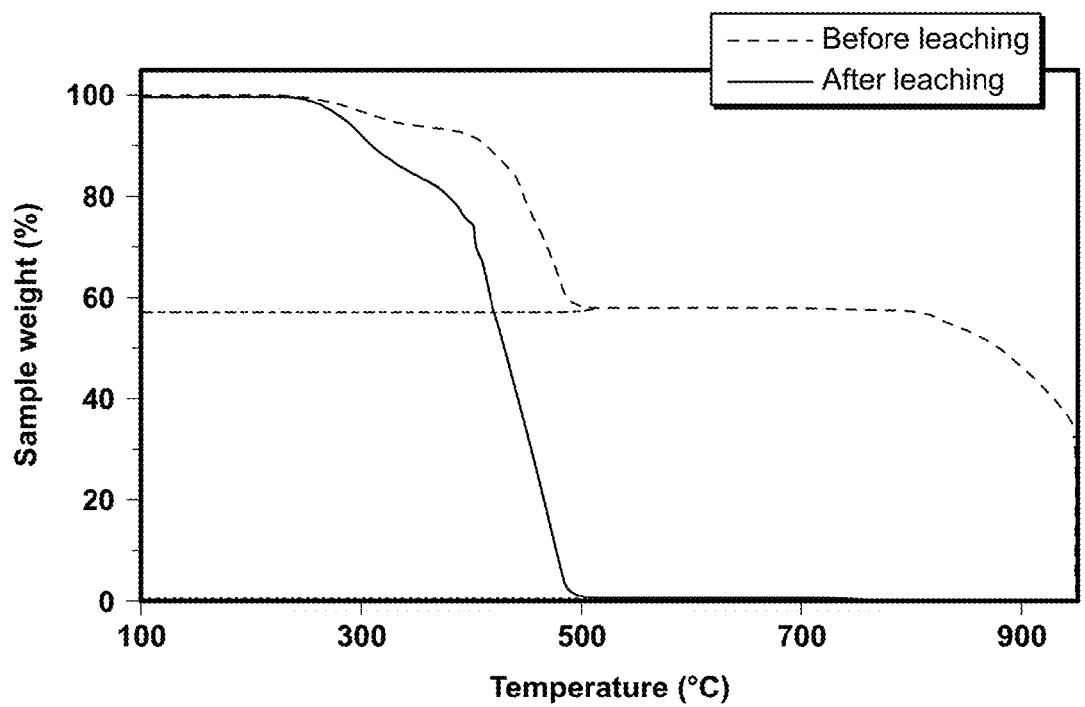
FIG. 4 shows TGA curves for LDPE hollow fiber membranes with initial salt content of 65 wt %, after leaching for 160 min.
Figure 5:
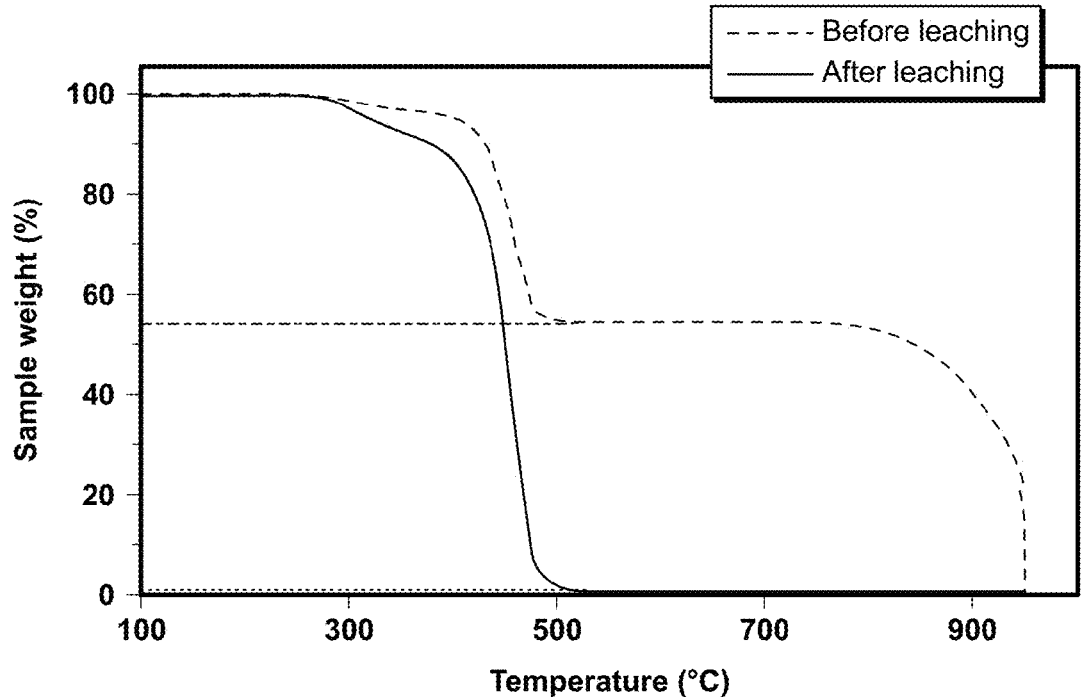
FIG. 5 shows TGA curves for LDPE hollow fiber membranes with initial salt content of 60 wt %, after leaching for 160 min.
Figure 6:
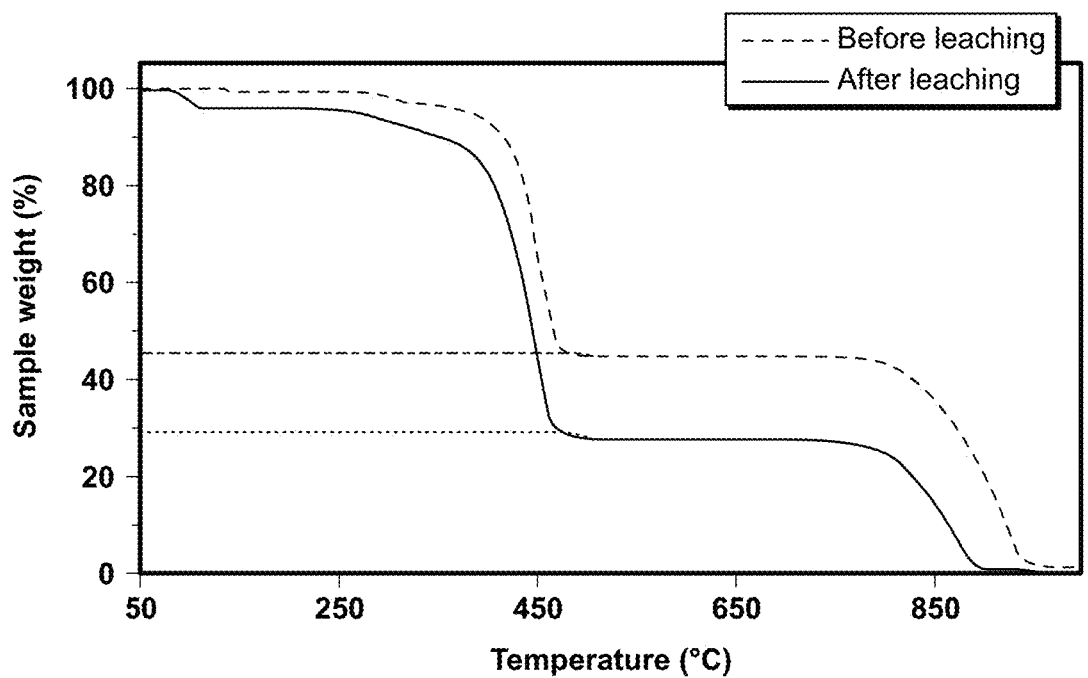
FIG. 6 shows TGA curves for LDPE hollow fiber membranes with initial salt content of 50 wt %, after leaching for 160 min.
Figure 7:
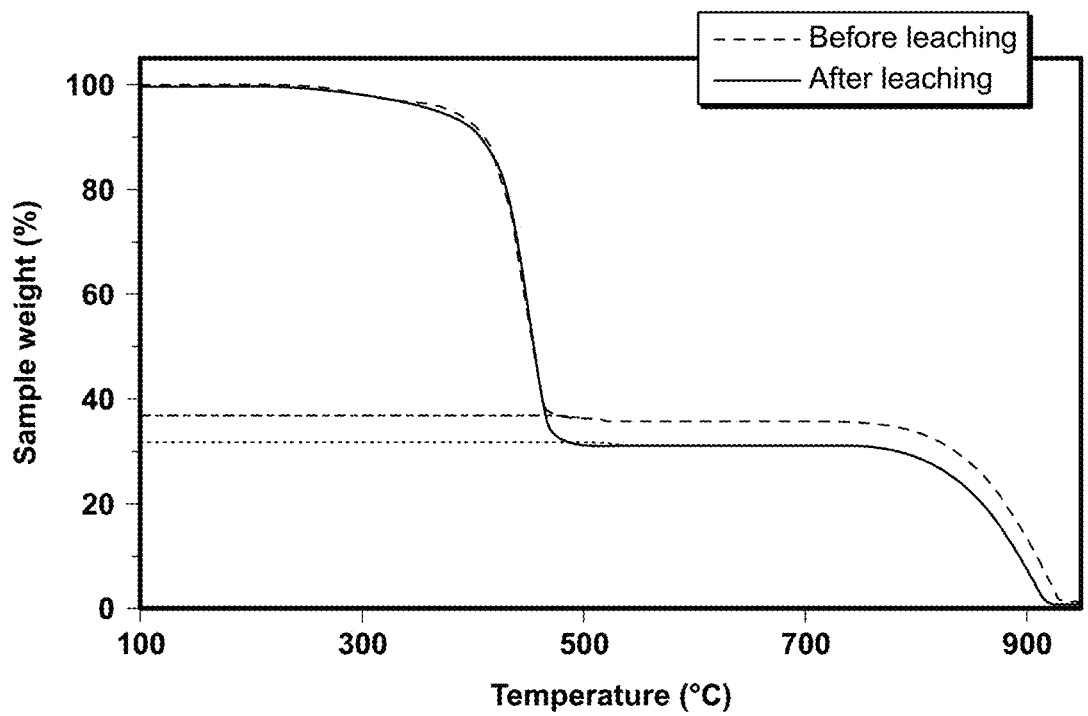
FIG. 7 shows TGA curves for LDPE hollow fiber membranes with initial salt content of 40 wt %, after leaching for 160 min.
Figure 8:
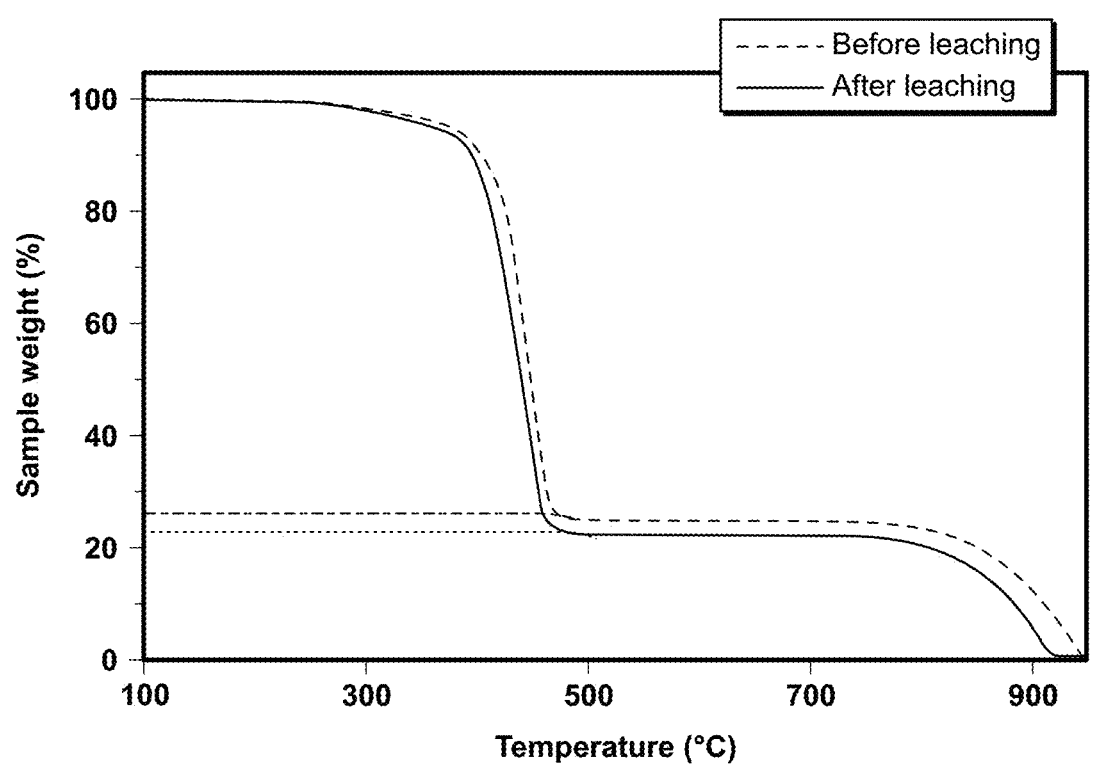
FIG. 8 shows TGA curves for LDPE hollow fiber membranes with initial salt content of 35 wt %, after leaching for 160 min.

FIG. 2 shows the percentage of salt removed from LDPE hollow fibers, fabricated using 35, 40, 50, 60, 65 and 68 wt % salt. The ultimate percentage of salt removal was found to increase with increasing initial salt content from 35 to 68 wt %, so that it reaches from about 3% and 5%, respectively for samples with initial salt contents of 35 and 40 wt % to about 100% for those containing 60-68 wt % NaCl. While not wishing to be limited by theory, this could be attributed to the increasing number of pathways formed by the interconnections of salt particles, as they get closer together with increasing salt content. The interconnecting pathways provide better access to water for leaching out the salt particles.

FIGS. 3-8 show the TGA curves of LDPE hollow fiber membranes with various initial salt contents. At a temperature range of around 300-500° C., a weight loss of about 70% is observed due to the polymer thermal degradation. After the complete degradation of polymer, the sample weight remains constant. The sample weight in this region (500-750° C.) is equivalent to the content of salt in the corresponding sample. The lower contents of NaCl shown by TGA than those initially blended with the polymer are attributed to the loss caused during fabrication (Table 4). The second break at around 750° C. corresponds to NaCl degradation. Considering the TGA curves, the following results can be obtained: 1. the real initial salt content for all samples is lower than those initially mixed with PE. While not wishing to be limited by theory, this can arise either from the loss of ultra-fine salt particles from the hopper or due to their sticking inside the extruder. 2. for samples with an initial salt content lower than 60 wt %, the leaching duration is too long, so that even after 160 min continuous leaching, a significant amount of salt remains inside the polymer matrix. This can confirm that a percentage of the salt removal increases by increasing the initial salt content.

TABLE 4

| Salt wt % before extrusion (in polymer/salt blend) | Salt wt % after 1st extrusion step (blending) | Salt wt % after 2nd extrusion step (fiber fabrication) | % salt loss at the 1st extrusion step | % salt loss at the 2nd extrusion step |
| --- | --- | --- | --- | --- |
| 35 | 27 | 25 | 22 | 7 |
| 40 | 37 | 36 | 7.5 | 2.7 |
| 50 | 42 | 44 | 16 | 4.7 |
| 60 | 56 | 53 | 7.1 | 3.5 |
| 65 | 59 | 57 | 9.2 | 3.3 |
| 68 | 61 | 59 | 10.2 | 3.3 |

Figure 9A:
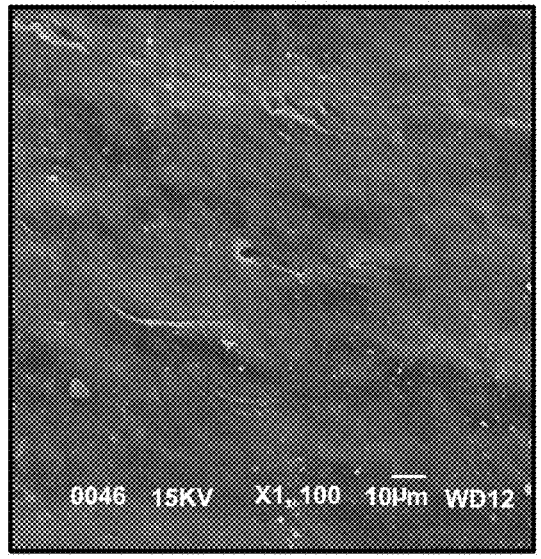
FIGS. 9A-9C show exemplary scanning electron microscope (SEM) micrographs of blank LDPE hollow fiber: 9A) external surface, 9B) internal surface and 9C) cross sectional edge.
Figure 9B:
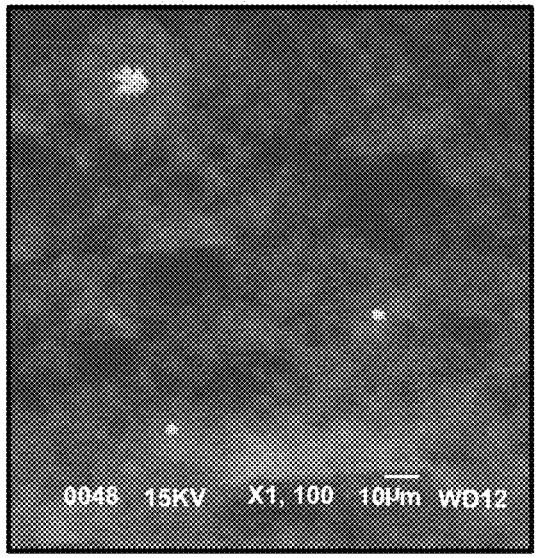
Figure 9C:
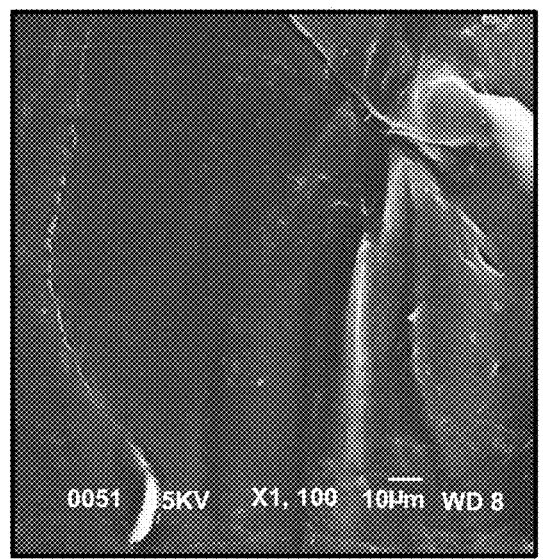
Figure 10A:
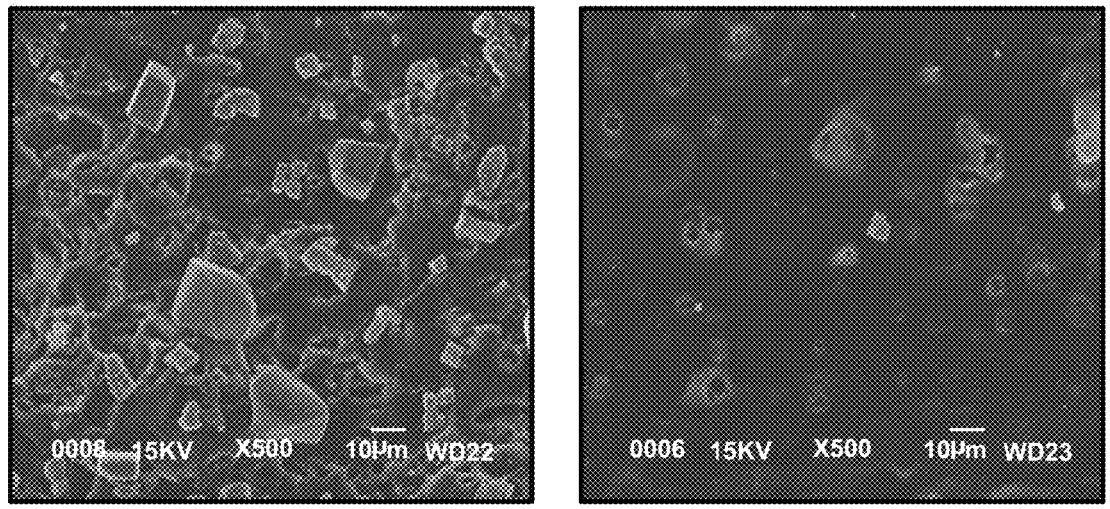
FIGS. 10A-10F show exemplary SEM micrographs of cross sectional (left side) and internal surfaces (right side) of LDPE hollow fiber membranes with 10A) 35 wt %, 10B) 40 wt %, 10C) 50 wt %, 10D) 60 wt %, 10E) 65 wt % and 10F) 68 wt % NaCl.
Figure 10B:
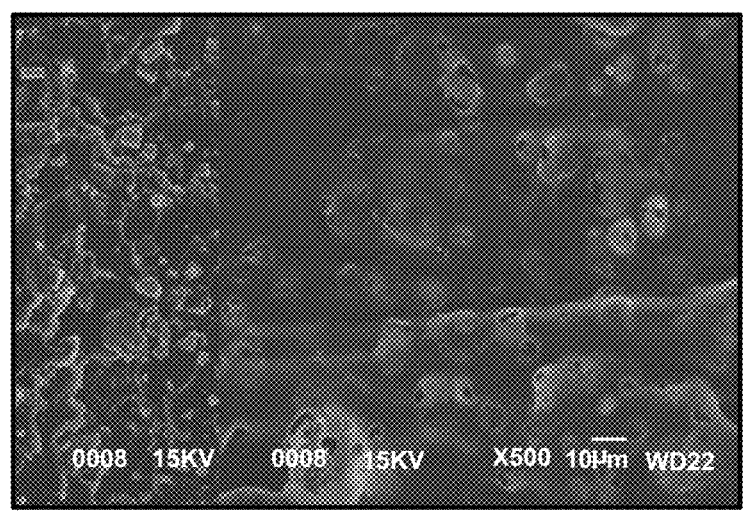
Figure 10C:
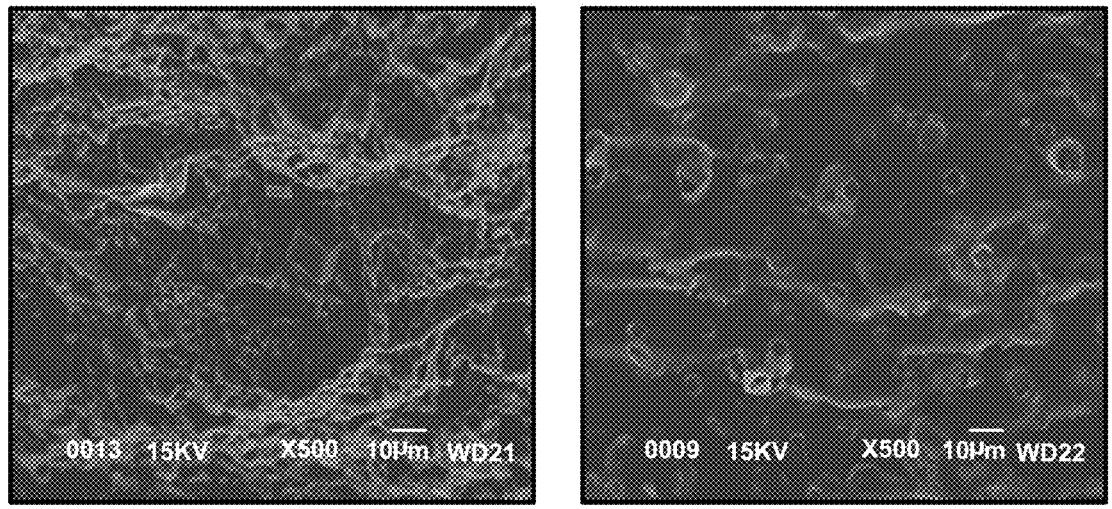
Figure 10D:
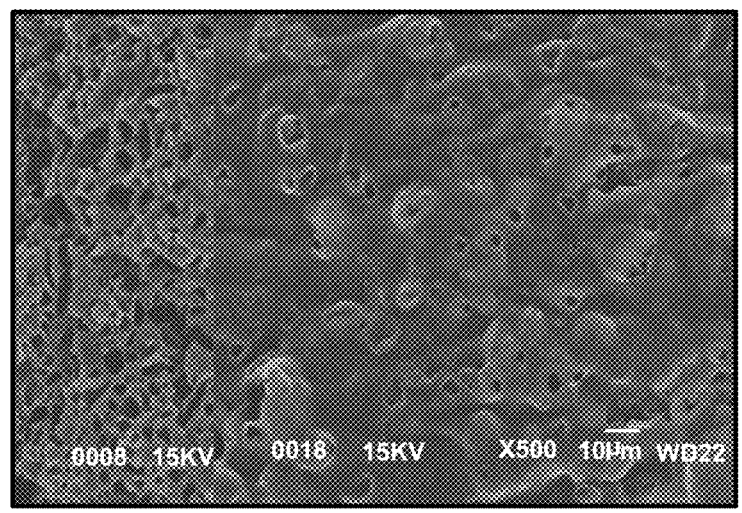
Figure 10E:
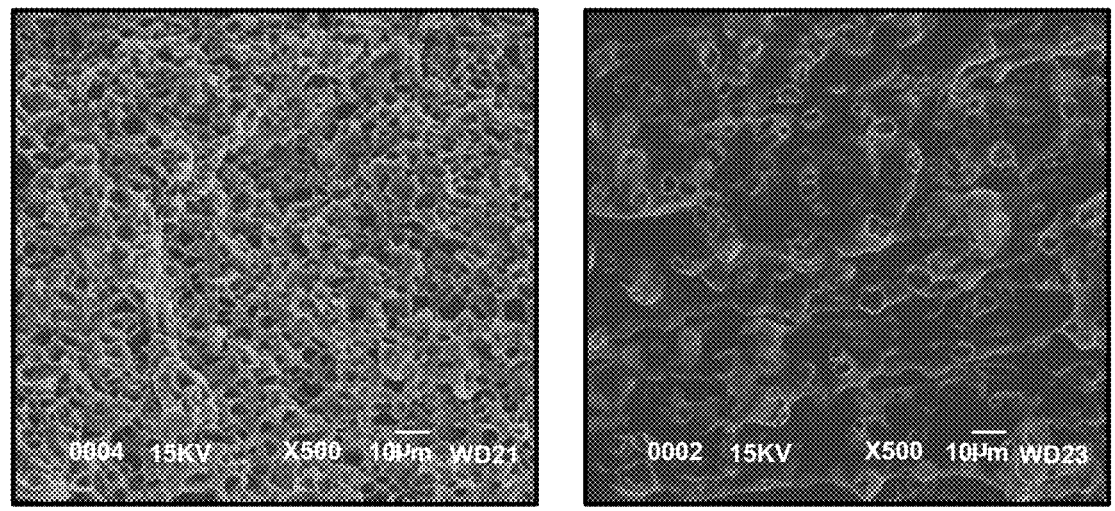
Figure 10F:
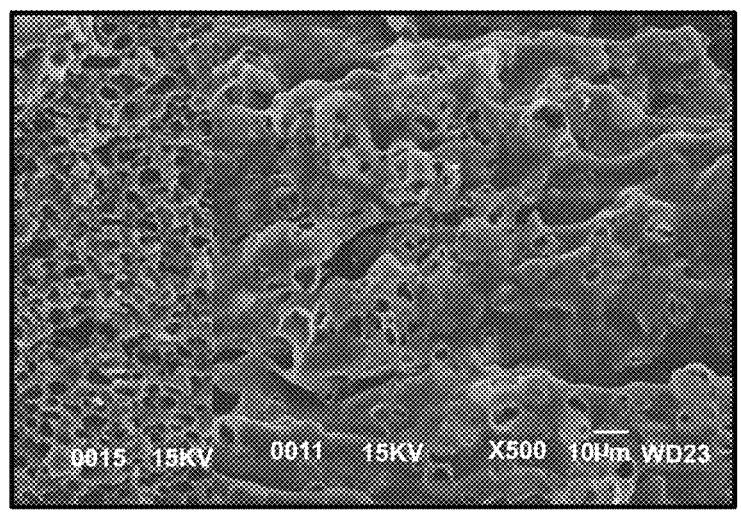

Such observations were confirmed by comparing the SEM micrographs of LDPE hollow fibers with 0-68 wt % initial NaCl content (FIGS. 9, 10). It can be clearly observed that the structure of hollow fibers changed from dense and nonporous (FIGS. 9A-9C) to porous and highly rough in character with a large number of micropapillas on the surface (FIGS. 10A-10F). In addition, SEM micrographs of cross sections of hollow fiber membranes evidently show that the porous structure becomes more interconnected and perforated through the thickness of the hollow fibers, as the initial salt content increases from 35 to 68 wt %.

The values of density and porosity of LDPE hollow fiber membranes are presented in Table 5. In accordance with the SEM micrographs, the porosity of hollow fiber samples increases from 0% for blank LDPE hollow fibers to about 51% for LDPE hollow fiber membranes with initial salt content of 68 wt %. Furthermore, the density of hollow fiber samples varies in reverse proportion to the initial salt content and fiber porosity.

TABLE 5

| | Property | |
| --- | --- | --- |
| Membrane | Density (g/cm³) | Porosity (%) |
| Blank (neat) | 0.92 | — |
| 35 wt % NaCl | 1.17 | 9 |
| 40 wt % NaCl | 1.04 | 13 |
| 50 wt % NaCl | 0.93 | 26 |
| 60 wt % NaCl | 0.72 | 49 |
| 65 wt % NaCl | 0.72 | 49 |
| 68 wt % NaCl | 0.70 | 51 |

Figure 11:
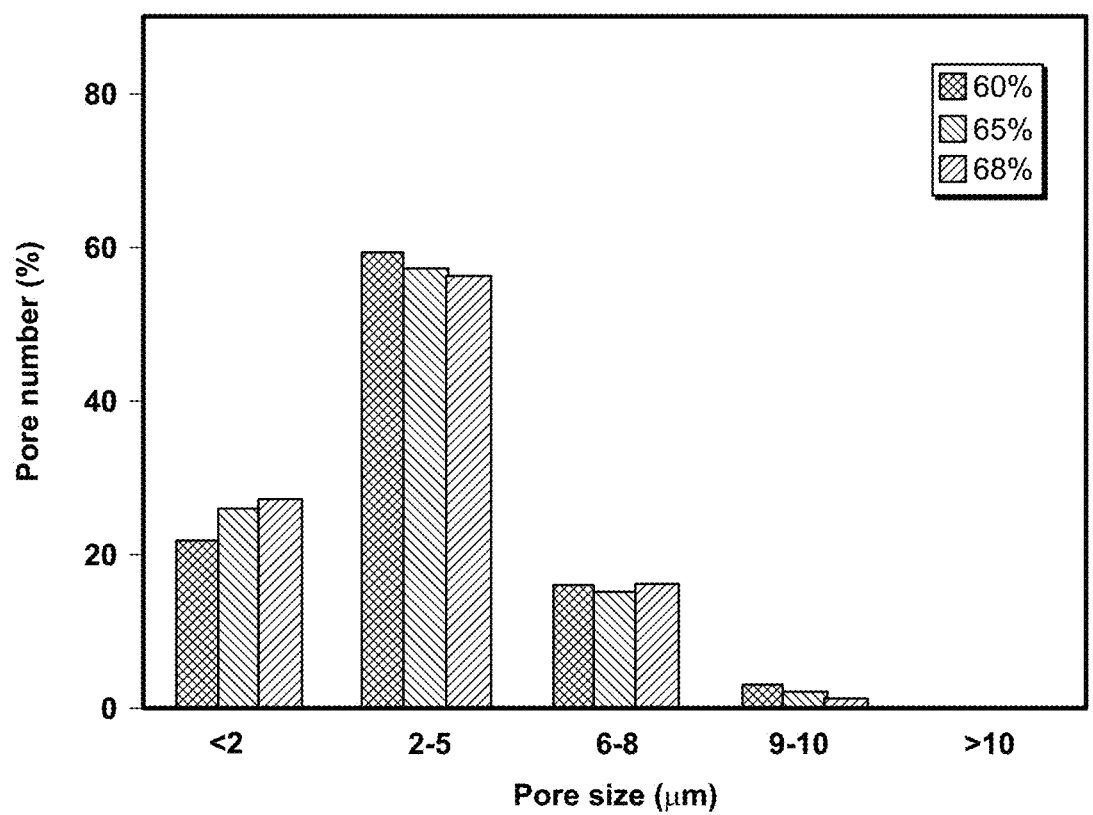
FIG. 11 shows pore size distribution of LDPE hollow fiber membranes with different initial salt contents (35-68 wt %).

FIG. 11 shows the pore size distribution of LDPE hollow fiber membranes with complete salt removal (samples prepared using 60-68 wt % salt). For all membranes, the maximum pore diameters are in the range of 2-5 µm. In addition, the pore diameters slightly decrease with increase in the initial salt content.

Example 3: Roughness Measurements of LDPE Hollow Fibers

Materials and Methods

Atomic Force Microscopy (AFM) experimental apparatus: AFM studies were conducted in tapping mode at the interior surface of hollow fibers using a Nanoscope III equipped with a 1553D scanner (Veeco Instruments Inc.).

Sample preparation: The access to the interior surface of membranes was done by cutting them longitudinally in very narrow ribbons of less than 1 mm width and 5 mm length. The analysis was done on the membranes with 40 and 68 wt % initial salt content and the blank fiber, for comparison.

The roughness parameters in terms of mean surface roughness ($R_a$), maximum roughness and RMS ($R_e$) were determined by the Veeco NanoScope Software version 5.30. $R_a$ and $R_s$ are calculated from:

$$R_a = \sqrt{\frac{\sum_{i=1}^{N}(Z_i - Z_{ave})^2}{N}}$$

and $$R_s = \frac{\sum_{i=1}^{N}|Z_i - Z_{cp}|^2}{N}$$

where N is the number of points in the measured surface area, $Z_i$ is the vertical scanner tip position at a given position of the image, $Z_{ave}$ is the average Z value and $Z_{cp}$ is the Z value of the center plane.

Results and Discussion

Figure 12A:
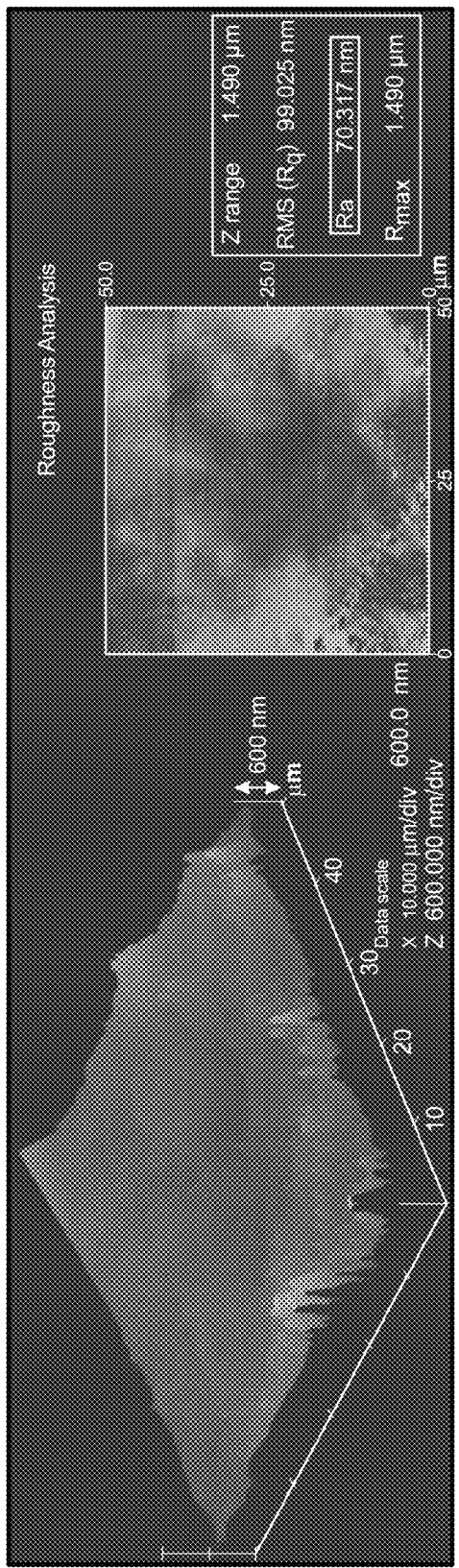
FIGS. 12A-12C show AFM analysis of 12A) blank LDPE hollow fibers, 12B) LDPE hollow fiber membrane with initial salt content of 40 wt % and 12C) LDPE hollow fiber membrane with initial salt content of 60 wt %.
Figure 12B:
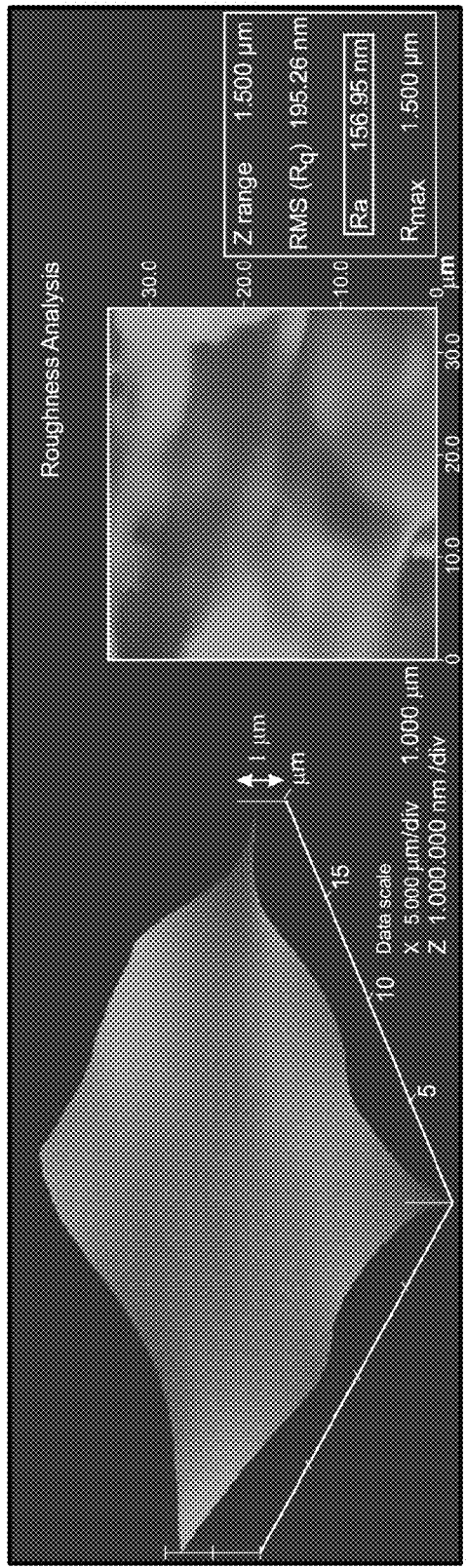
Figure 12C:
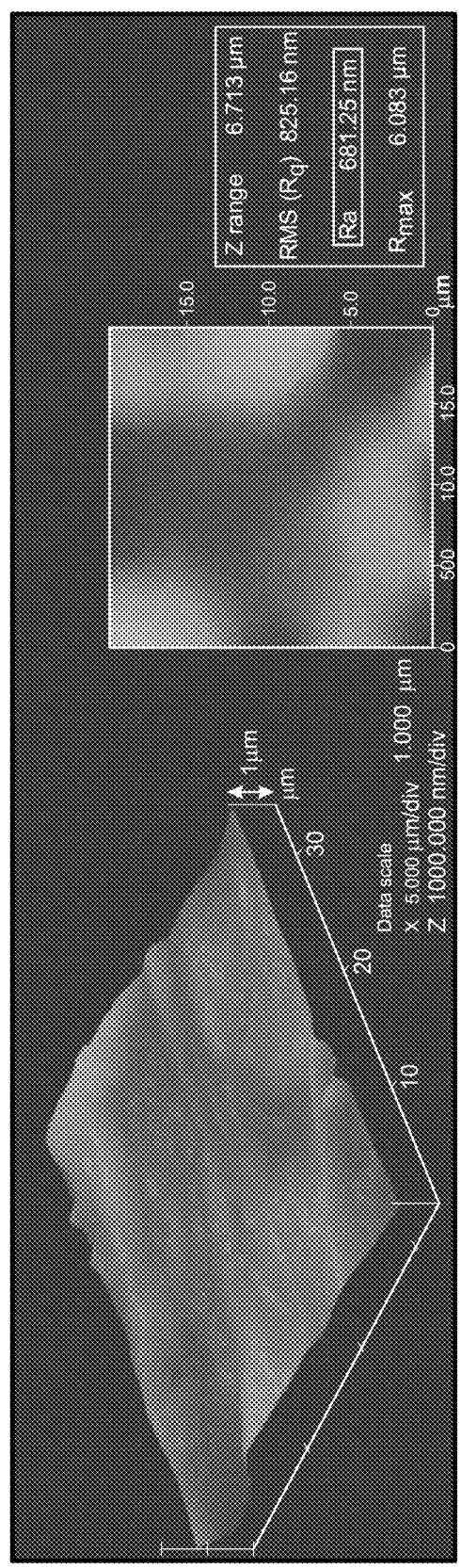

FIGS. 12A-12C shows AFM plots and the calculated of LDPE fibers The scanning scale which is equivalent to the height of the peaks (micropapillas) of the surface rises from 600 nm for the blank sample to 7.1 µm for the sample with initial salt content of 60 wt %. In addition, the mean roughness ($R_a$) increases as the initial salt content rises, so that it reaches from about 70 nm for the smooth surface of the blank LDPE hollow fiber to about 157 nm for the membrane with 40 wt % of initial salt and to 681 nm for the membrane with initial salt content of 60 wt %.

Example 3: Contact Angle Measurements of LDPE Hollow Fibers

Materials and Methods

The optical contact angle analyzer (OCA15 EC Plus, Dataphysics) was used to measure water contact angles of LDPE hollow fibers using the sessile drop method. The system employed a high resolution camera and specific software developed to capture and analyze the contact angle on very small and curved surfaces[2]. For very precise measurements, water droplets of 0.15 µl were dispensed on both inner and outer surfaces of hollow fiber samples via an ultra-thin needle with an internal diameter of 0.18 mm. For each experimental condition, measurements were performed on at least three samples and on three different portions of each sample in order to ensure the reproducibility of the results. The reported data for contact angles is the average of three obtained values.

Results and Discussion

Table 6 shows the static water contact angle of LDPE hollow fiber samples.

TABLE 6

| Membrane | Contact angle (°) | Errors (°) |
| --- | --- | --- |
| Blank (neat) | 98.2 | ±0.6 |
| 35 wt % NaCl | 104.0 | ±0.6 |
| 40 wt % NaCl | 105.9 | ±0.7 |
| 50 wt % NaCl | 111.1 | ±0.6 |
| 60 wt % NaCl | 128.2 | ±2.4 |
| 65 wt % NaCl | 133.6 | ±0.9 |
| 68 wt % NaCl | 140.3 | ±1.9 |

It can be clearly observed that contact angle rises with the increase in initial salt content, so that for the sample with 68 wt % initial salt content, the contact angles reaches 140°. This is attributed to higher surface roughness, caused by the increase in the number of micropapillas, and high porosity membrane structure form as the initial salt content increases. The surface of microporous LDPE hollow fibers can be considered as a composite comprising trapped air and rough LDPE. According to the Cassie and Baxter theory[3], the contact angle of a hydrophobic rough surface comprising solid and air can be determined using the following relation:

$$\cos \theta_r = f_1 \cos \theta - f_2 \quad (4)$$

where θ refers to the contact angle of smooth surface, $\theta_r$ defines the contact angle of rough surface and $f_1$ and $f_2$ are respectively the fractions of solid and air in the composite surface. This equation predicts that increasing the fraction of air ($f_2$) would lead to the increase in the contact angle. Since the roughness and porosity increase by raising the initial salt content, more air can be trapped in the pores and surface valleys leading to the increase in the contact angle. This remarkable rise of contact angles by increasing the initial salt content, can arise from the lower tendency of the surface to wetting, and is considered as the "lotus effect" which can be mimicked in artificial highly hydrophobic surfaces[16,17,18]. By increasing the initial salt content much rougher surface is obtained (FIGS. 12A-C), which can end up with less contact between the sample surface and the testing liquid.

Example 4: Mechanical Properties of LDPE Hollow Fiber Membranes

Materials and Methods

Mechanical properties of LDPE hollow fiber membranes including tensile strength, Young's modulus and stress at break were measured using a RSA-3 Dynamic Mechanical Analyzer (DMA) supplied by TA Instruments. During the test, the hollow fiber membranes were held with grips, while a crosshead pulls fibers in tension at constant rate of 10 mm/min until the fiber can no longer resist and it is torn.

Strain was measured by the apparatus and the load-strain curve was developed. By dividing the load by the cross-sectional area of the sample, the stress-strain curve for each hollow fiber membrane was obtained. The modulus of elasticity (Young's modulus), which indicates the stiffness of the material or its resistance against elastic strain, was then determined by the slope of the stress-strain curve in the elastic region.

Results and Discussion

Figure 13:
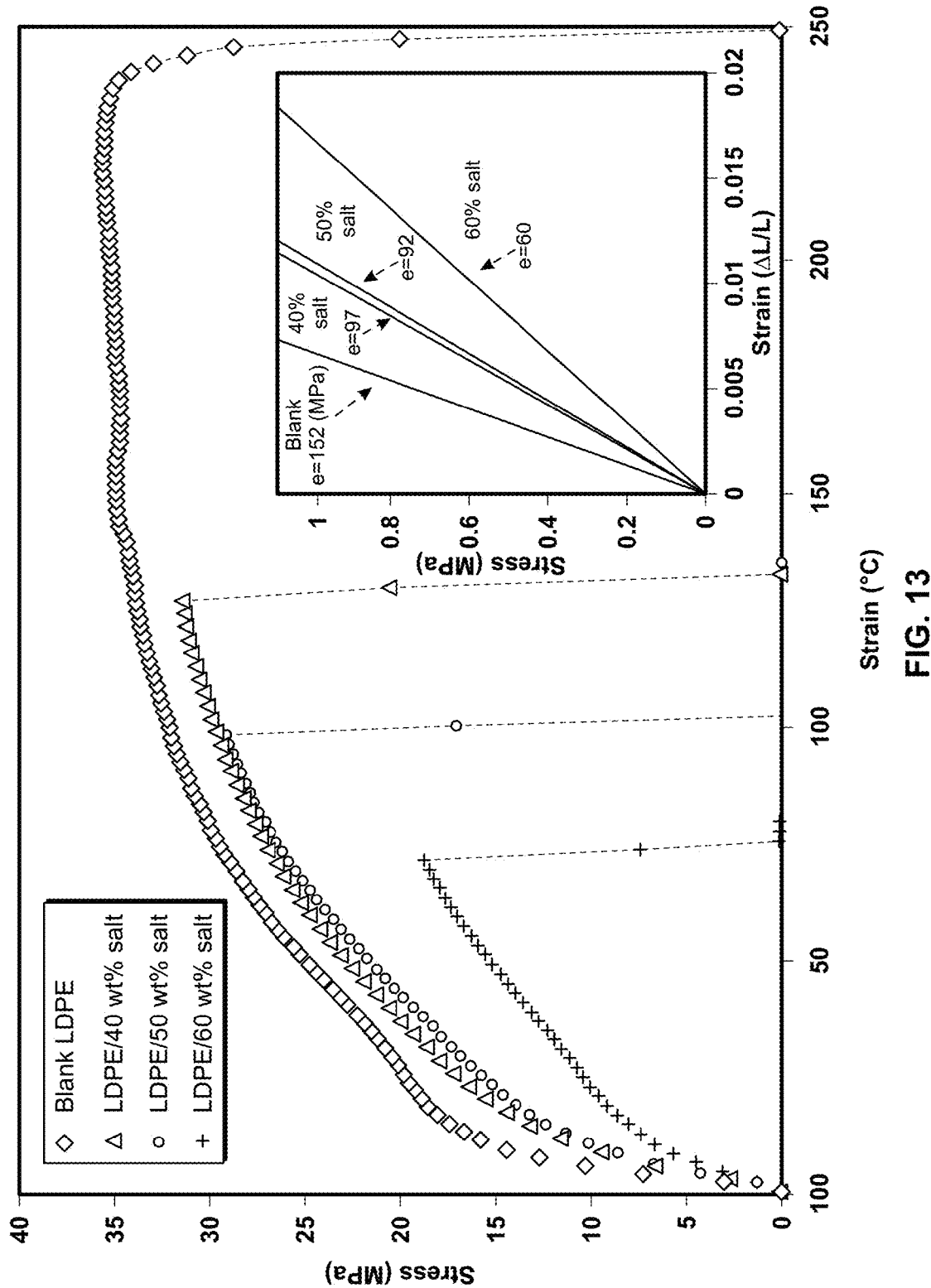
FIG. 13 shows stress-strain curves of LDPE hollow fiber membranes.

The stress-strain curves of LDPE hollow fiber samples, the corresponding tensile stress and strain at break, as well as the Young's modulus are depicted in FIG. 13. Young's modulus of hollow fiber samples decreased with an increase in the initial salt content, from 152 MPa for the blank sample to 60 MPa for the sample with an initial salt content of 60 wt %. While not wishing to be limited by theory, this can be attributed to cracks formed in the hollow fiber structure due to the high osmotic pressure during the salt extraction process. For the hollow fiber membrane with an initial salt content of 40 wt %, the stress at break reduces to 31 MPa, compared to that of 35 MPa for blank hollow fiber. This value reduces to 18 MPa for the membrane with an initial salt content of 60 wt %. While not wishing to be limited by theory, this can be due to the porous and cracked structure formed during the long salt extraction process, as described earlier.

Furthermore, the reduction of tensile stress of hollow fiber membranes with an increase in initial salt content is the expected result of the addition of rigid particles to glassy polymers[4]. This deterioration in mechanical properties has been observed in the literature for porous polymeric membranes and rigid particle filled polymeric compounds[13,36,37].

Example 5: Preparation of LDPE Fibers Via Literature Conditions

Several polyethylene (LDPE) fibers were fabricated via melt-extrusion following the conditions given in the paper by Dangtungee and Supaphol[31]. The NaCl-containing fibers were then leached with water for a prolonged time (7 days), in order to verify the salt removal and the pore formation. The SEM micrographs of the corresponding samples (FIGS. 14b-e) showed that no matter the conditions used (salt content and particle size varying between 5 and 25 wt % and 45 and 125 µm, respectively), dense and non-porous fiber structures were formed, even after a long leaching period.

Figure 14A:
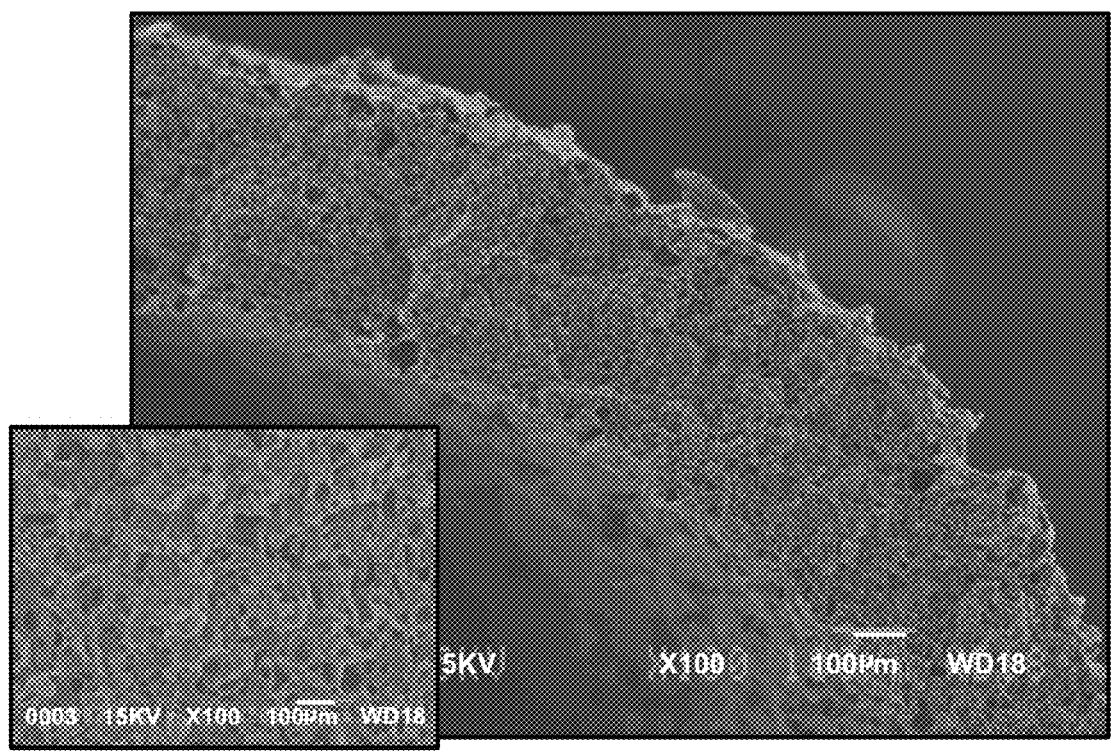
FIGS. 14A-E shows exemplary SEM images of (14A) examples fibers of the present application (5-10 µm salt-60 wt %): highly porous membranes (small pores); (14B-E) fibers fabricated using mixtures of polyethylene (LDPE) and sodium chloride (NaCl) as indicated in Dangtungee and Supaphol (2010)[31]: (14B) 125 µm salt-25 wt %; (14C) 125 µm salt-5 wt %; (14D) 45 µm salt-25 wt %; and (14E) 45 µm salt-5 wt %: non-porous fibers.
Figure 14B:
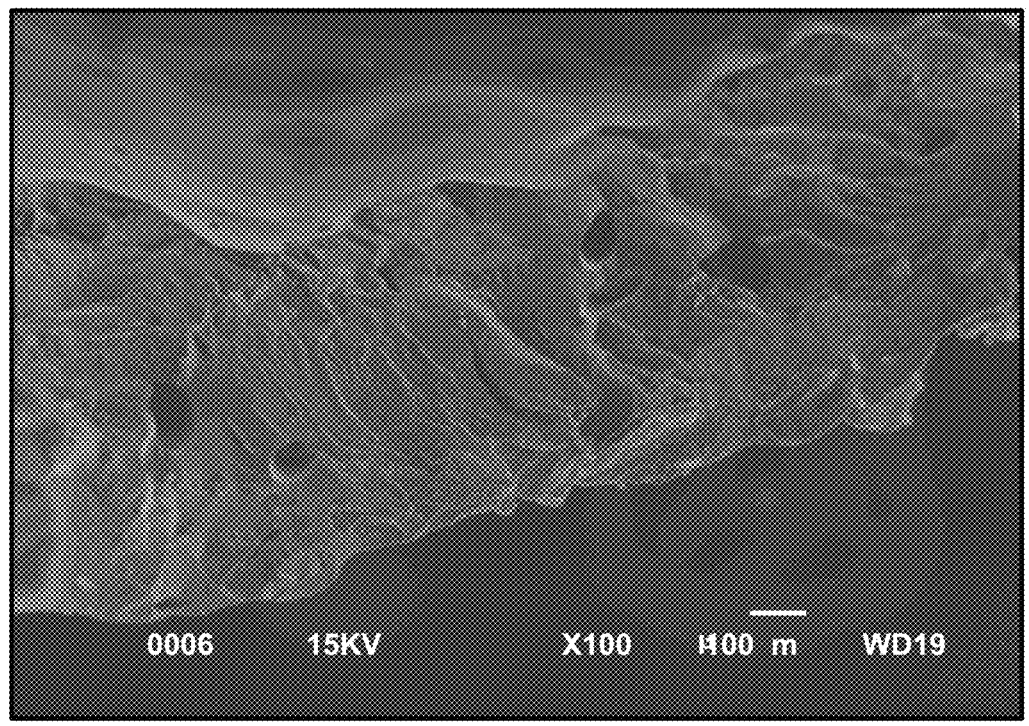
Figure 14C:
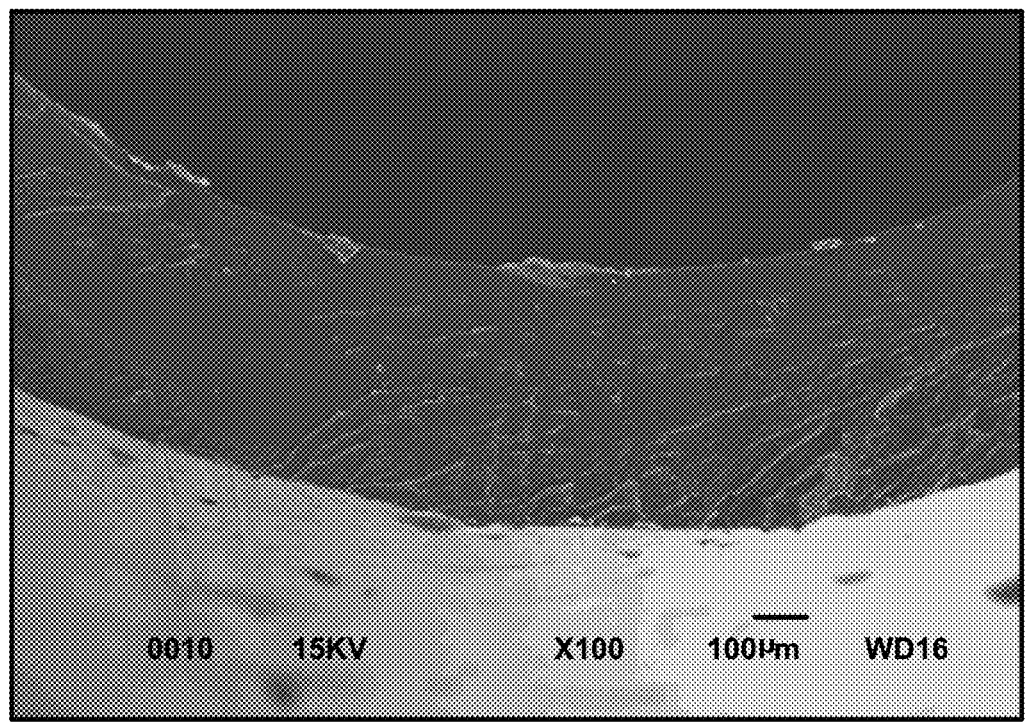
Figure 14D:
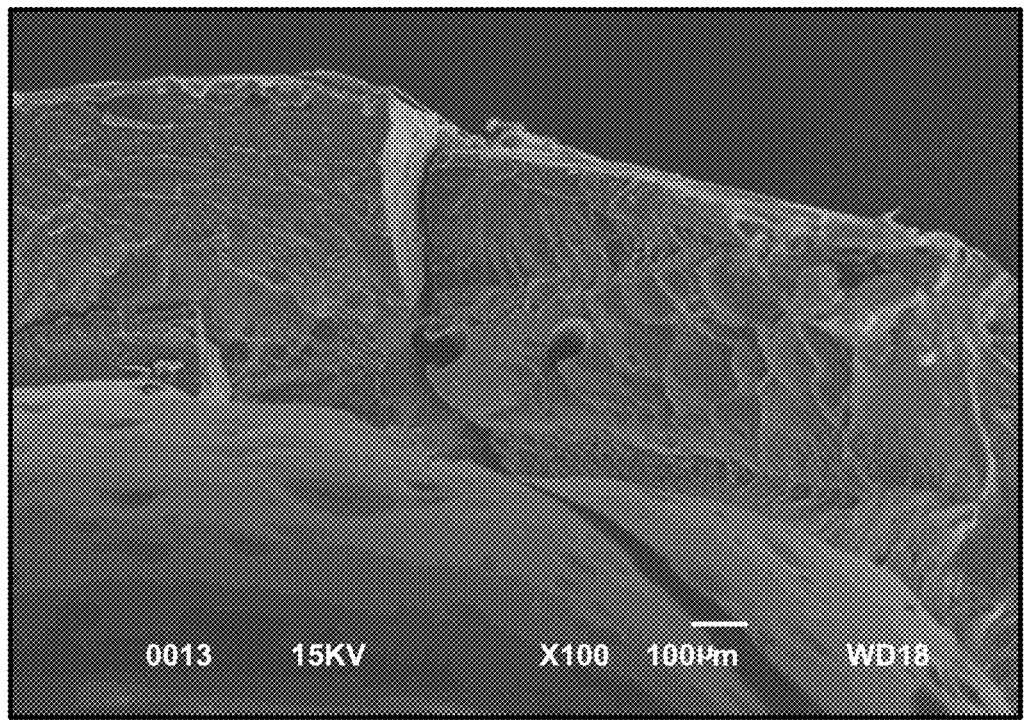
Figure 14E:
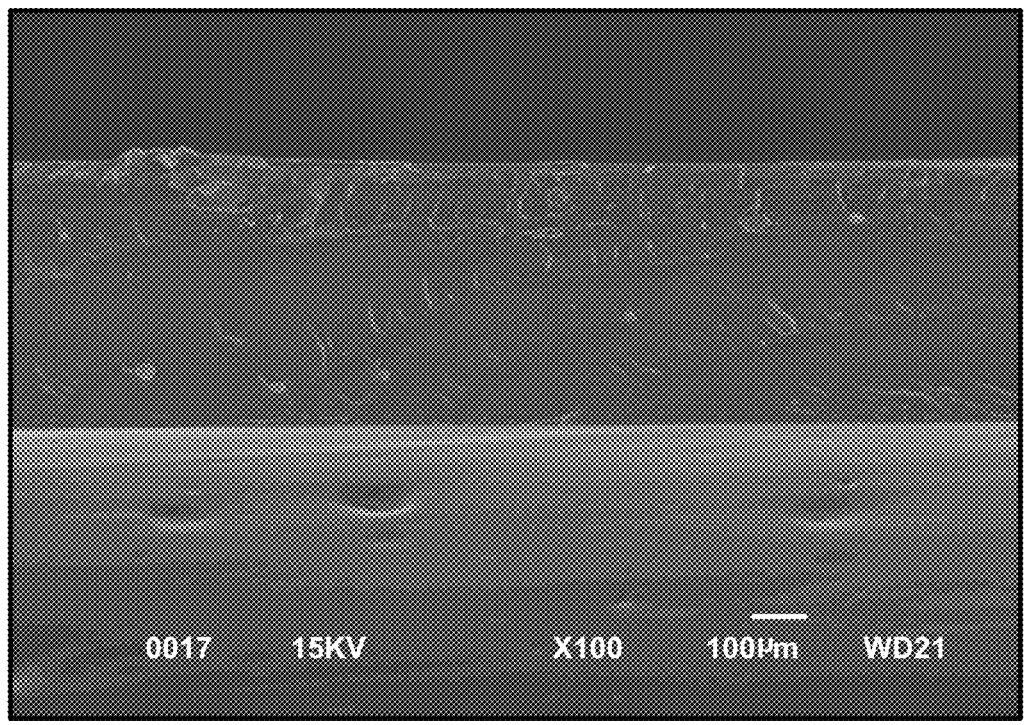
Figure 15A:
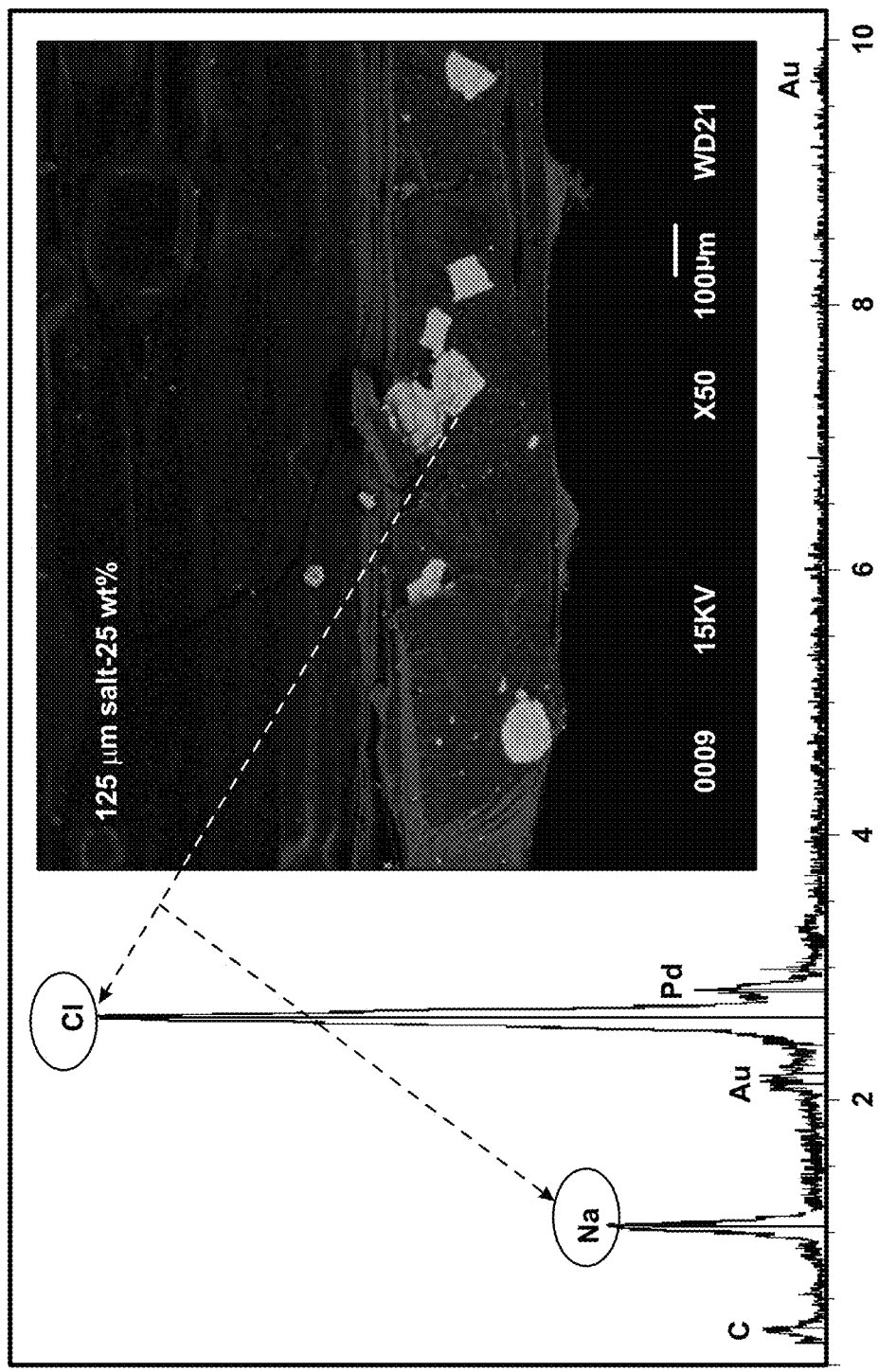
FIGS. 15A-15D shows exemplary backscattered electron detector (BSE) Images and energy dispersive x-ray spectroscopy (EDS) analysis of fibers prepared using the mixtures indicated in Dangtungee and Supaphol (2010)[31]: (15A) 125 µm salt-25 wt %; (15B) 125 µm salt-5 wt %; (15C) 45 µm salt-25 wt %; (15D) 45 µm salt-5 wt %. The contrast in the color shows the existence of impurities. White portions indicate salt crystals.
Figure 15B:
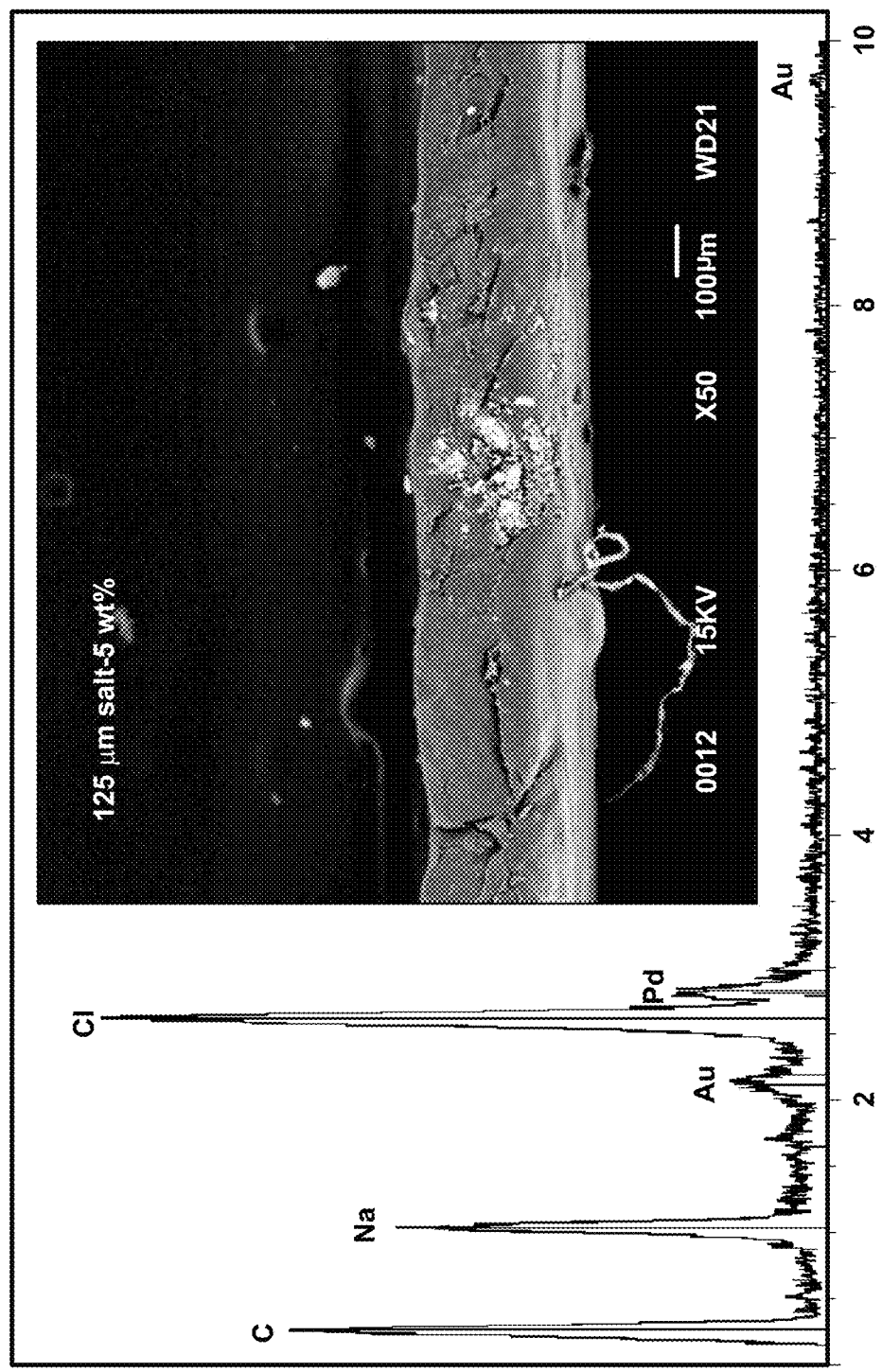
Figure 15C:
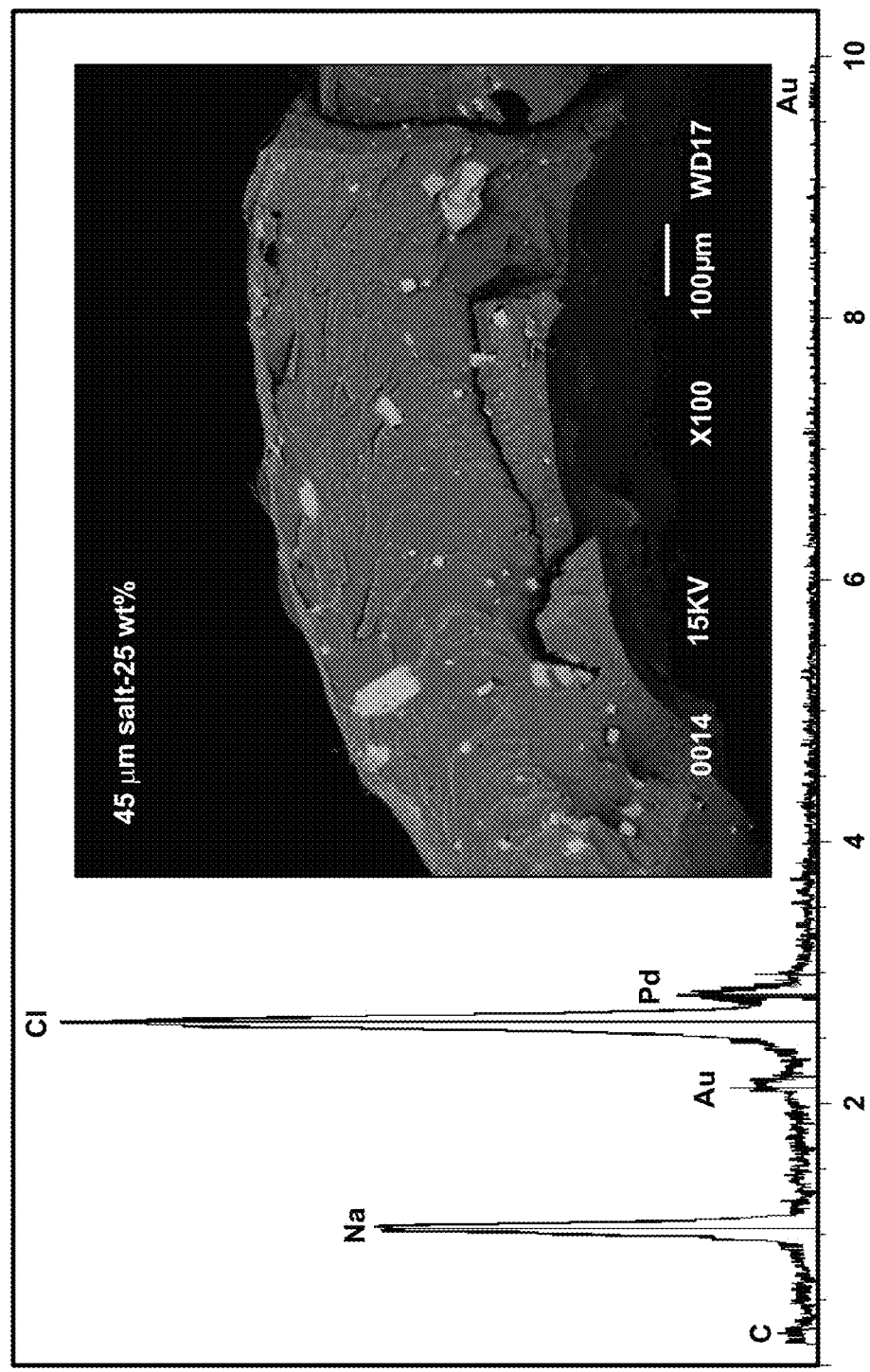
Figure 15D:
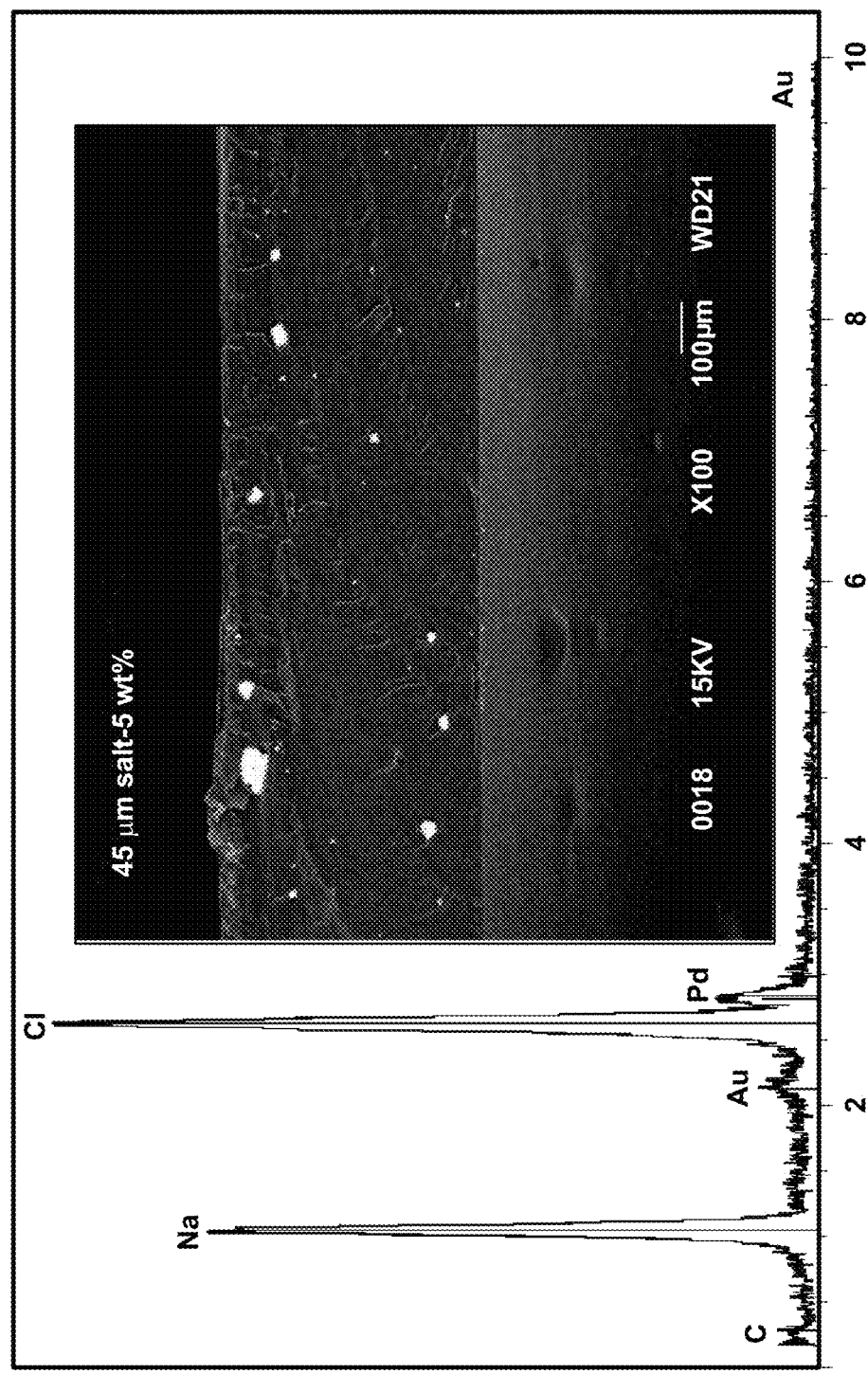
Figure 16A:
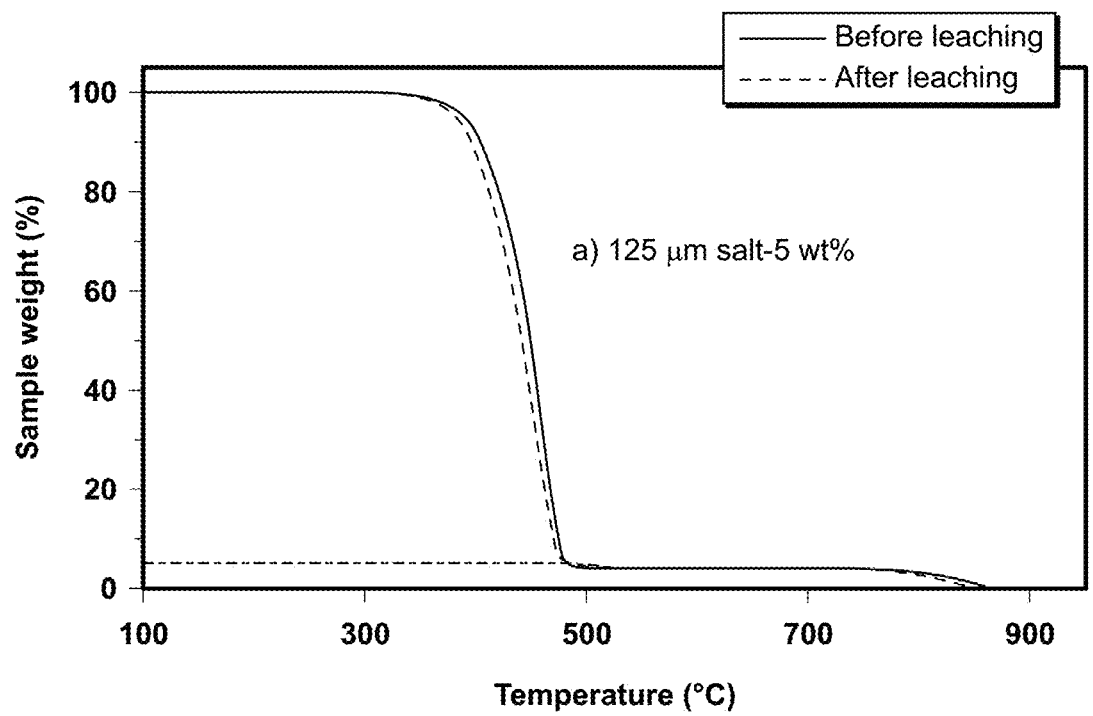
FIGS. 16A-16F shows TGA diagrams of (a-d) fibers prepared as indicated in Dangtungee and Supaphol (2010)[31]: (16A) 125 µm salt-5 wt %; (16B) 125 µm salt-25 wt %; (16C) 45 µm salt-5 wt %; (16D) 45 µm salt-25 wt %—significant amount of salt remains in the fibers even after prolonged time of leaching (7 days); (16E) an example of membrane of the present application: 5-10 µm salt-60 wt %—no salt remains in the fiber structure after leaching; (16F) pure salt and pure LDPE.
Figure 16B:
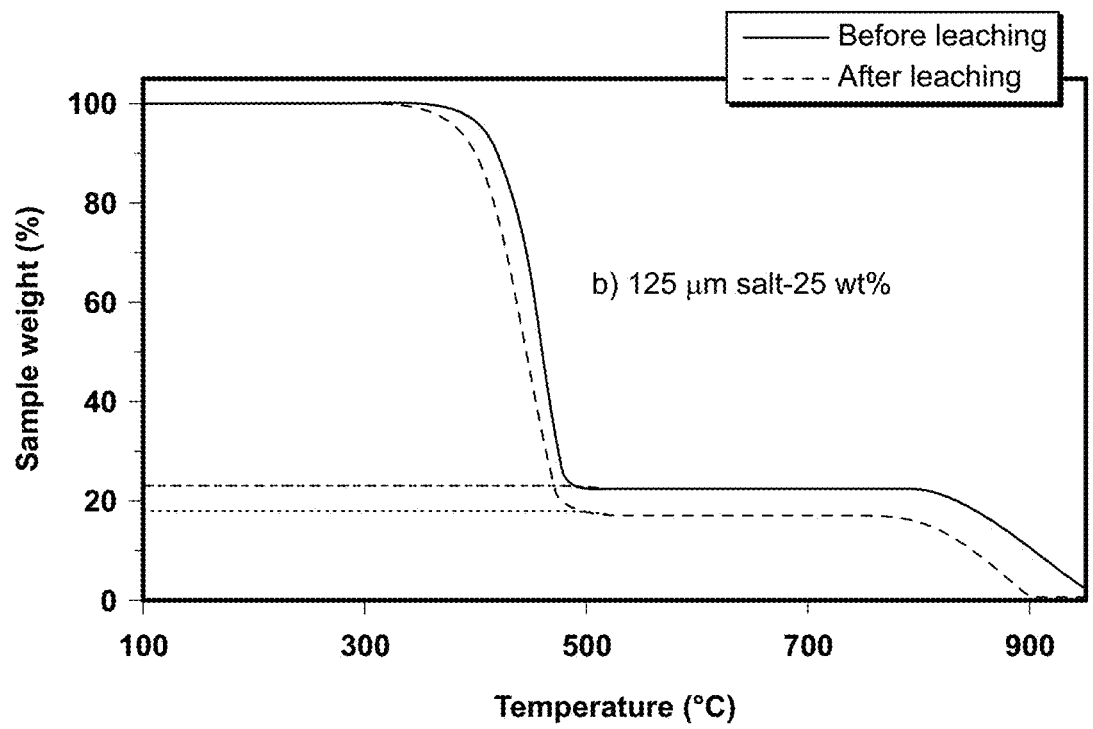
Figure 16C:
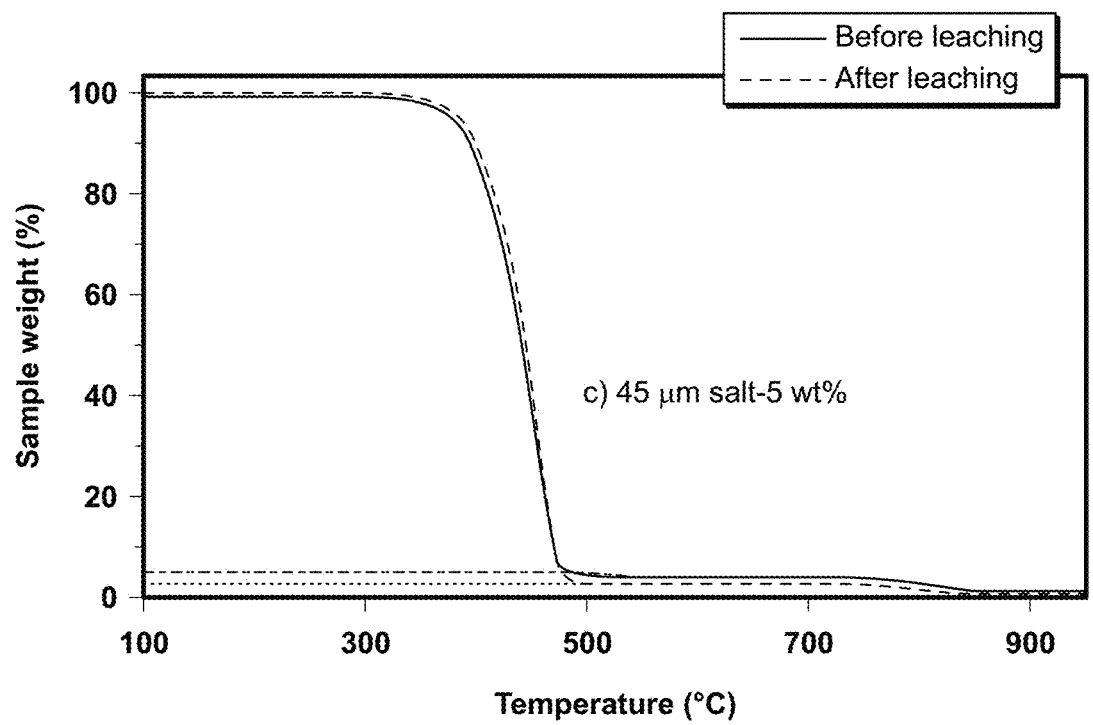
Figure 16D:
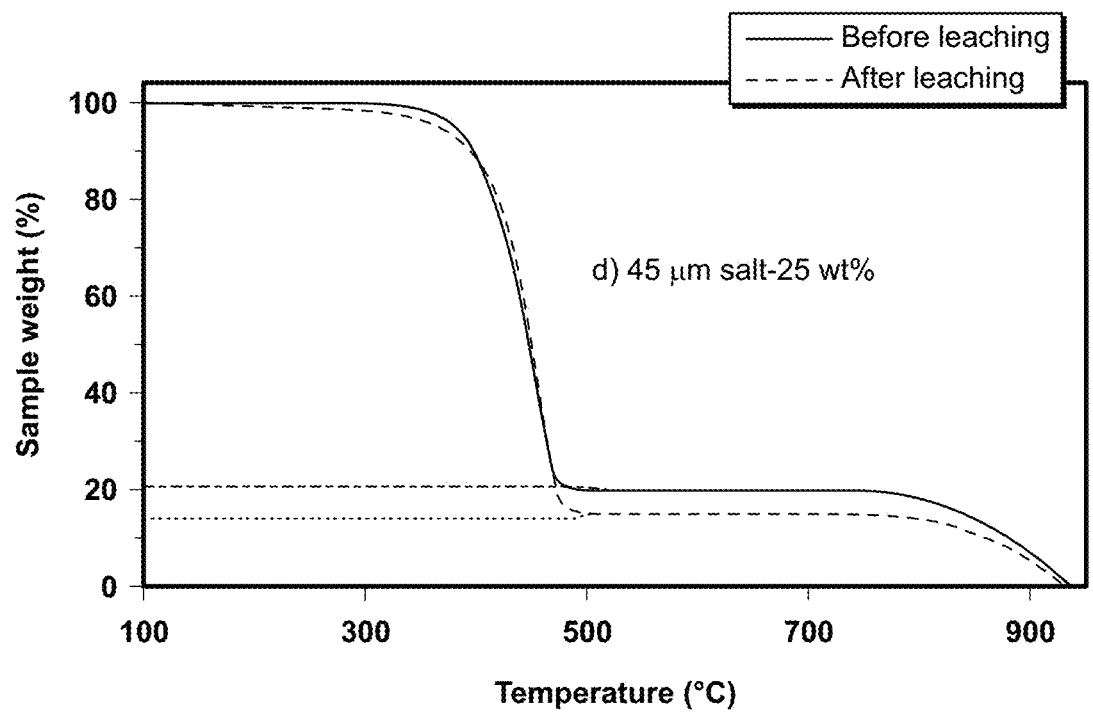
Figure 16E:
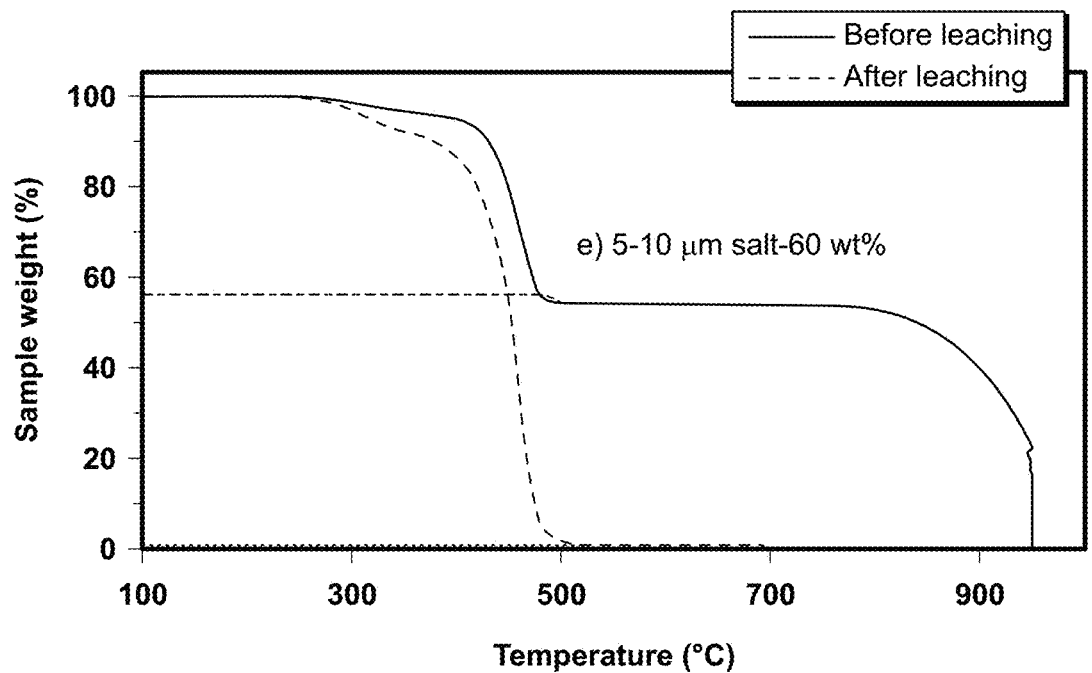
Figure 16F:
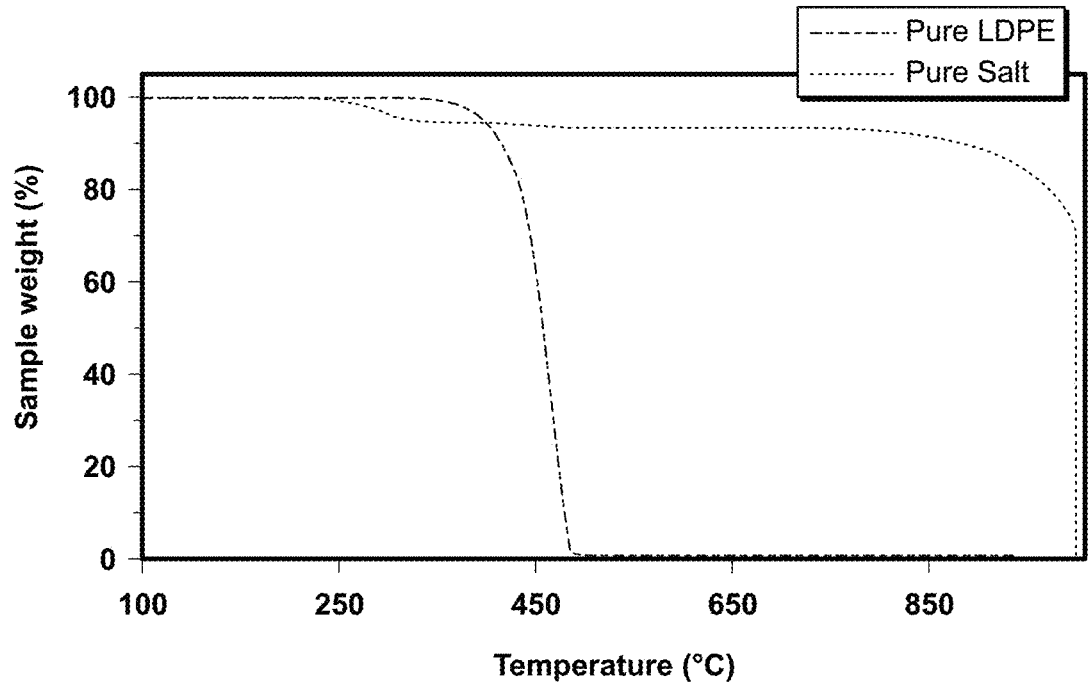

In contrast, the fiber of the present application prepared by melt-extrusion/160 min leaching, using 60 wt % NaCl of 5-10 µm, presented a highly porous structure with small pores, characteristic to a microporous membrane (FIG. 14a). In addition to the SEM micrographs, BSE (Back-scattered Electron Detector) images and EDS (Energy-Dispersive X-Ray Spectroscopy) analysis also indicated the presence of NaCl in the leached fibers fabricated using the literature conditions[31] (FIGS. 15A-D). Finally, TGA (thermogravimetric analysis) diagrams of the same fibers[31] confirm the existence of salt particles after leaching (FIGS. 16A-D), in contrast to the example of the membrane of the present application where a significant difference is observed between the curves before and after leaching (FIG. 16E).

Example 6: Comparison to Untreated and Treated PP Membranes

Figure 17:
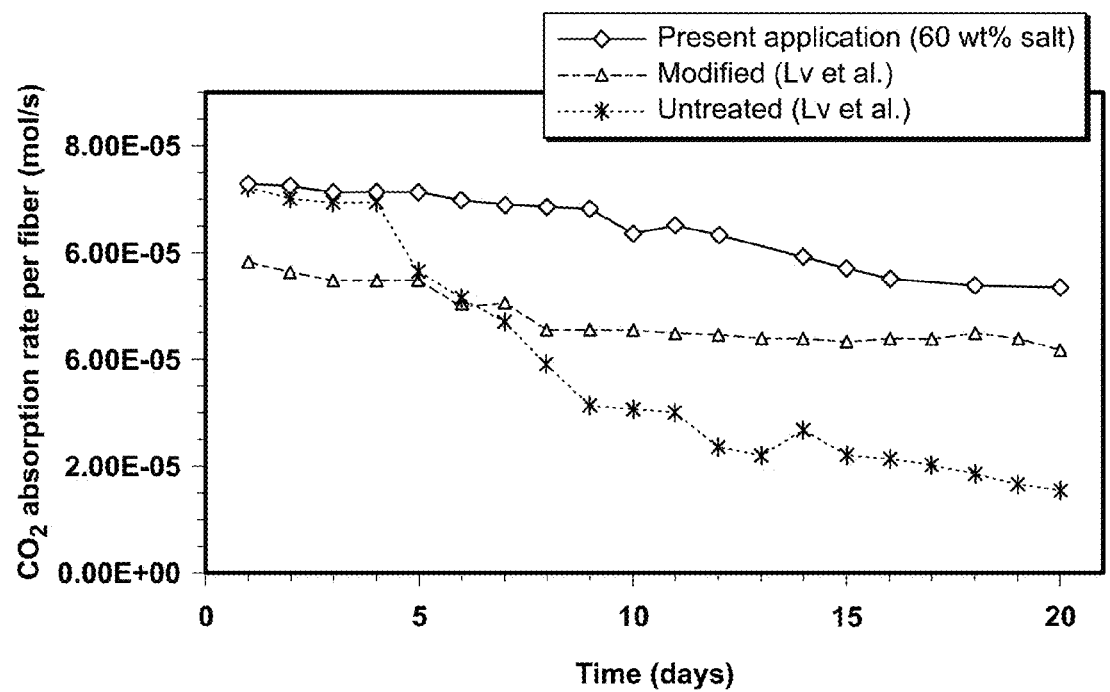
FIG. 17 shows $CO_2$ absorption in amine solution corresponding to the hollow fiber membrane of the present application compared with the results reported in Lv et al.[33] Solution: aqueous monoethanolamine (MEA): 1 mol/l; Gas concentration: 20% $CO_2$; Liquid flow rate: 17 cc/min; Gas flow rate: 200 cc/min.

Lv et al.[33] performed a solvent (cyclohexanone and methyl ethyl ketone mixture) based treatment of polypropylene (PP) membrane fibers by depositing a rough layer on the surface in order to improve its hydrophobicity and consequently, to reduce the wetting phenomenon. Membrane efficiency was tested by $CO_2$ absorption in aqueous solutions of monoethanolamine in a membrane contactor for 20 days. A comparison between untreated (commercially available) PP, treated (solvent casting method) PP and the LDPE membrane of the present application is shown in FIG. 17. The LDPE membrane shows a more stable and efficient performance (higher absorption flux and less decrease in the flux during the time).

The person skilled in the art would understand that the various properties or features presented in a given embodiment can be added and/or used, when applicable, to any other embodiment covered by the general scope of the present disclosure.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE SPECIFICATION

[1] V. Y. Dindor, D. W. F. Brilman, F. H. Geuzebroek, G. F. Versteeg, Membrane-Solvent Selection for $CO_2$ Removal Using Membrane Gas-Liquid Contactors, Sep. Purif. Technol. 40 (2004) 133-145.

[2] N. Nishikawa, M. Ishibashi, H. Ohta, N. Akutsu, H. Matsumoto, T. Kamata, H. Kitamura, $CO_2$ Removal by Hollow Fiber Gas-Liquid Contactor, Energy Conyers. Mgmt. 36 (1995) 415-418.

[3] O. Falk Pedersen, H. Dannstrom, Separation of Carbon Dioxide from Offshore Gas Turbine Exhaust, Energy Conyers. Mgmt. 38 (1997) S81-S86.

[4] Y.-S. Kim, S.-M. Yang, Absorption of Carbon Dioxide through Hollow Fiber Membranes using Various Aqueous Absorbents, Sep. Purif. Technol., 21(2000)101-109.

[5] H. Matsomuto, H. Kitamura, T. Kamata, Effect of Membrane Properties of Microporous Hollow-Fiber Gas-Liquid Contactor on $CO_2$ Removal from Thermal Power Plant Hue Gas, J. Chem. Eng. Jpn 28 (1995) 125-128.

[6] D. deMontigny, P. Tontiwachwuthikul, A. Chakma, Using Polypropylene and Polytetrafluoroethylene Membranes in a Membrane Contactor for $CO_2$ Absorption, J. Membr. Sci. 277 (2006) 99-107.

[7] S. Khaisri, D. deMontigny, P. Tontiwachwuthikul, R. Jiraratananon, Comparing Membrane Resistance and Absorption Performance of Three Different Membranes in a Gas Absorption Membrane Contactor, Sep. Purif. Technol. 65 (2009) 290-297.

[8] H. A. Rangwala, Absorption of Carbon Dioxide into Aqueous Solutions Using Hollow Fiber Membrane Contactors, J. Membr. Sci. 112 (1996) 229-240.

[9] P. S. Kumar, J. A. Hogendoorn, P. H. M. Feron, G. F. Versteeg, New Absorption Liquids for the Removal of $CO_2$ from Dilute Gas Streams Using Membrane Contactors, Chem. Eng. Sci. 57 (2002) 1639-1651.

[10] J.-G. Lu, H. Zhang, M.-D. Cheng, L.-J. Wang, $CO_2$ Capture Through Membrane Gas Absorption with Aqueous Solution of Inorganic Salts-Amino Acid Salts, J. Fuel. Chem. Technol. 37 (2009) 77-81.

[11] S.-H. Yeon, B. Sea, Y.-I. Park, K.-H. Lee, Determination of Mass Transfer rates in PVDF and PTFE Hollow Fiber Membranes for $CO_2$ Absorption, Sep. Sci. Technol. 38 (2003) 271-293.

[12] D. K. Lee, I. H. Baek, W. L. Yoon, Modeling and Simulation for the Methane Stem Reforming Enhanced by In-Situ $CO_2$ Removal Utilizing the CaO Carbonation for $H_2$ Production, Chem. Eng. Sci. 59 (2004) 931-942.

[13] Z.-Y. Xi, Y.-Y. Xu, L.-P. Zhu, Ch.-H. Du, B.-K. Zhu, Effect of Stretching on Structure and Properties of Polyethylene Hollow Fiber Membranes Made by Melt-Spinning and Stretching Process, Polym. Adv. Technol. 19 (2008) 1616-1622.

[14] M. Jin, X. Feng, J. Xi, K. Cho, L. Feng, L. Jiang, Superhydrophobic PDMS Surface with Ultra Low Adhesive Force, Macromol. Rapid. Commun. 26 (2005) 1805-1809.

[15] J.-Y. Shui, C.-W. Kuo, P. Chen, Ch.-Y. Mou, Fabrication of Tunable Superhydrophobic Surfaces by Nanosphere Lithography, Chem. Mater. 16 (2004) 561-564.

[16] X. Lu, Ch. Zhang, H. Yanchun, Low-Density Polyethylene Superhydrophobic Surface by Control of Its Crystallization Behavior, Macromol. Rapid Commun. 25 (2004) 1606-1610.

[17] J. A. Franco, S. E. Kentish, J. M. Perera, G. Stevens, Fabrication of a Superhydrophobic Polypropylene Membrane by Deposition of a Porous Crystalline Polypropylene Coating, J. Membr. Sci. 318 (2008) 107-113.

[18] Zh. Yuan, H. Chen, J. Zhang, D. Zhao, Y. Liu, X. Zhou, S. Li, P. Shi, J. Tang X. Chen, Preparation and Characterization of Self-cleaning Stable Superhydrophobic Linear Low-Density Polyethylene, Sci. Technol. Adv. Mater. 9 (2008) 1-5.

[19] Y. Lee, S.-H. Park, Fabrication of Hierarchical Structures on a Polymer Surface to Mimic Natural Superhydrophobic Surfaces, Adv. Mater. 19 (2007) 2330-2335.

[20] R. Blossey, Self Cleaning Surfaces, Nat. Mater. 2 (2003) 301-306.

[21] M. Ma, R.-M. Hill, J.-L. Lowery, S. V. Fridrikh, Electrospun Poly(Styrene-Block-Dimethylsiloxane) Block Copolymer Fibers Exhibiting Superhydrophobicity, Langmuir 21 (2005) 5549-5554.

[22] S. S. Kim and D. R. Lloyd, Microporous Membrane Formation Via Thermally-Induced Phase Separation. III. Effect of Thermodynamic Reactions on the Structure of Isotactic Polypropylene Membrane, J. Membr. Sci. 64 (1991) 13-29.

[23] I. Pinnau, W. J. Koros, A Qualitative Skin Layer Formation Mechanism for Membranes Made by Dry/Wet Phase Inversion, J. Polym. Sci. B: Polym. Phys. 31 (1993) 419-427.

[24] B. Krause, M. E. Boerrigter, N. F. A. van der Vegt, H. Strathmann, M. Wessling, Novel Open-Cellular Polysulfone Morphologies Produced With Trace Concentrations of Solventsas Pore Opener, J. Membr. Sci. 187 (2001) 181-192.

[25] S.-H. Lin, K.-L. Tung, W.-J. Chen, H.-W. Chang, Absorption of Carbon Dioxide by Mixed Piperazine-Alkanolamine Absorbent in a Plasma-Modified Polypropylene Hollow Fiber Contactor, J. Membr. Sci. 333 (2009) 30-37.

[26] R. W. Gore, Process for Producing Porous Products, U.S. Pat. No. 3,953,566 (1976).

[27] Zh.-Y. Xi, Y.-Y. Xu, L.-P. Zhu, Ch.-H. Du, B.-k. Zhu, Effect of Stretching on Structure and Properties of Polyethylene Hollow Fiber Membranes Made by Melt-Spinning and Stretching Process, Polym. Adv. Technol. 19 (2008) 1616-1622.

[28] J.-J. Kim, T.-S. Jang, Y.-D. Kwon, U. Y. Kim, S. S. Kim, Structural-Study of Microporous Polypropylene Hollow Fiber Membranes Made by the Melt-Spinning and Cold-Stretching Method, J. Membr. Sci. 93 (1994) 209-215.

[29] R. K. M. Chu, H. E. Naguib, NAtalla, Synthesis and Characterization of Open-Cell Foams for Sound Absorption with Rotational Molding Method, Polym. Eng. Sci. 49 (2009) 1744-1754.

[30] M. Narkis, E. Joseph, Tensile Properties of Rigid Polymeric Foams Produced by Salt Extraction, J. Cell. Plast. 14 (1978) 45-49.

[31] R. Dangtungee, P. Supaphol, Melt Rheology and Extrudate Swell of Sodium Chloride-Filled Low-Density Polyethylene: Effects of Content and Size of Salt Particles, Polym. Test. 29 (2010) 188-195.

[32] L. Verdolotti, S. Colini, G. Porta, S. Iannace, Effects of the Addition of LiCl, $LiClO_4$, and $LiCF_3SO_3$ Salts on the Chemical Structure, Density, Electrical, and Mechanical Properties of Rigid Polyurethane Foam Composite, Polym. Eng. Sci. 51 (2011) 1138-1134.

[33] Y. Lv, X. Yu, J. Jia, S.-T. Tu, J. Yan, E. Dahlquist, Fabrication and Characterization of Superhydrophobic Polypropylene Hollow Fiber Membranes for Carbon Dioxide Absorption, Appl. Energy, 90 (2012) 167-174.

[34] S. Mosadegh Sedghi, J. Brisson, D. Rodrigue, M. C. Iliuta, Chemical alteration of LDPE Hollow Fibers Exposed to Monoethanolamine Solutions Used as Absorbent for $CO_2$Capture Process, Sep. Purif. Technol. In Press http://dx.doi.org/10.1016/j.seppur.2011.05.017.

[35] A. B. D. Cassie, S. Baxter, Wettability of Porous Surfaces, Trans. Faraday. Soc. 40 (1944) 546-551.

[36] M. Narkis, E. Joseph, Tensile Properties of Rigid Polymeric Foams Produced by Salt Extraction, J. Cell. Plast. 14 (1987) 45-49.

[37] A. E. Childress, P. Le-Clech, J. L. Daugherty, C. Chen, G. L. Leslie, Mechanical Analysis of Hollow Fiber Membrane Integrity in Water Reuse Applications, Desalination 180 (2005) 5-14.

The invention claimed is:

1. A method for preparing a microporous hollow fiber membrane, which comprises:
   mixing at least one polymer suitable for melt extrusion with at least one suitable water soluble salt having an average particle size of about 1 to about 20 µm under conditions suitable to form a mixture comprising about 60 to about 70% by weight of the at least one suitable water soluble salt based on the total weight of the mixture;
   extruding the mixture under conditions suitable to form a hollow fiber membrane comprising the mixture; and
   leaching the hollow fiber membrane comprising the mixture in water under conditions suitable for at least substantially removing the salt from the hollow fiber membrane,
   said prepared microporous hollow fiber membrane having a water contact angle of about 110 to about 140° and a porosity of about 40 to about 60%.

2. The method of claim 1, wherein the at least one suitable water soluble salt has an average particle size of about 2 to about 15 µm.

3. The method of claim 1, wherein the at least one suitable water soluble salt has an average particle size of about 5 to about 10 µm.

4. The method of claim 1, wherein the mixture comprises about 60 to about 68% by weight of the at least one suitable water soluble salt based on the total weight of the mixture.

5. The method of claim 1, wherein the conditions suitable to form the mixture comprise:
   mixing the at least one polymer suitable for melt extrusion with the at least one suitable water soluble salt so as to form a physical blend; and
   feeding the physical blend into an apparatus suitable for melt blending the at least one polymer suitable for melt extrusion with the at least one suitable water soluble salt to form the mixture.

6. The method of claim 1, wherein the conditions suitable to form a hollow fiber membrane comprise feeding the mixture into an apparatus suitable for melt extruding the mixture through a hollow fiber die.

7. The method of claim 6, wherein the hollow fiber die has an inside diameter of about 1 mm to about 10 mm, and an outside diameter of about 1.5 mm to about 11 mm.

8. The method of claim 1, wherein the conditions suitable for at least substantially removing the salt from the hollow fiber membrane comprise leaching the hollow fiber membrane with water in a vessel at a temperature suitable for weakening the mechanical properties of the at least one polymer suitable for melt extrusion, for a time of about 120 min to about 200 min.

9. The method of claim 1, wherein the polymer suitable for melt extrusion is chosen from thermoplastic melt-processable polymers, thermoplastic melt-processable copolymers, thermoplastic melt-processable elastomers, thermoplastic melt-processable composites, heat-curable thermoset polymers, heat-curable thermoset copolymers, heat-curable thermoset elastomers and heat-curable thermoset composites.

10. The method of claim 1, wherein the polymer suitable for melt extrusion is chosen from polyolefins, polyolefin composites, vinyl polymers, polyacrilonitriles, polystyrene, polyesters, polyurethanes, nylons, and polyethersulfones.

11. The method of claim 1, wherein the polymer suitable for melt extrusion is low density polyethylene (LDPE).

12. The method of claim 11, wherein the LDPE has a density of about 910 $kg/m^3$ to about 925 $kg/m^3$.

13. The method of claim 12, wherein the LDPE has a melt index of about 0.8 g/10 min to about 7.5 g/10 min.

14. The method of claim 13, wherein the hollow fiber membrane is leached with water at a temperature of about 10° C. to about 60° C.

15. The method of claim 5, wherein the suitable water soluble salt is sodium chloride.

16. The method of claim 1, wherein the suitable water soluble salts is chosen from alkali metal salts and alkaline-earth metal salts.

17. The method of claim 1, wherein the suitable water soluble salts is chosen from alkali metal chlorides, alkali metal bromides, alkali metal iodides, alkali metal fluorides, alkali metal acetates, alkali metal carbonates, alkali metal phosphates, alkali metal sulfates and alkali metal nitrates.

18. A microporous hydrophobic hollow fiber membrane comprising:
 a porosity of about 40 to about 60%;
 a mean roughness ($R_a$) of about 600 nm to about 800 nm;
 a water contact angle of about 110 to about 140°; and
 microporous pores having an average diameter of about 1 to about 20 μm.

19. The microporous hydrophobic hollow fiber membrane of claim 18, wherein said membrane comprises:
 a water contact angle of about 128 to about 140°; and
 microporous pores having an average diameter of about 1 to about 10 μm.

20. The method of claim 1, wherein the prepared microporous hollow fiber membrane has a mean roughness ($R_a$) of about 600 to about 800 nm.

21. The method of claim 1, wherein the at least one suitable water soluble salt has an average particle size of about 1 to about 10 μm.

22. The method of claim 1, wherein the at least one suitable water soluble salt has an average particle size of about 2 to about 10 μm.

23. The method of claim 1, wherein the prepared hollow fiber membrane has microporous pores having an average diameter of about 1 to about 10 μm.

24. The method of claim 1, wherein the prepared microporous hollow fiber membrane has a water contact angle of about 128 to about 140°.

25. The method of claim 1, wherein the prepared microporous hollow fiber membrane has a porosity of about 49 to about 51%.

26. The microporous hydrophobic hollow fiber membrane of claim 18, wherein said membrane comprises a porosity of about 49 to about 51%.

* * * * *